(12) United States Patent
Gamba

(10) Patent No.: US 12,025,208 B2
(45) Date of Patent: Jul. 2, 2024

(54) SLIDING CABLE SAFETY DEVICE FOR GENERATING AN ALARM SIGNAL

(71) Applicant: Davide Gamba, Biella (IT)

(72) Inventor: Davide Gamba, Biella (IT)

( * ) Notice: Subject to any disclaimer, the term of this patent is extended or adjusted under 35 U.S.C. 154(b) by 0 days.

(21) Appl. No.: 18/278,829

(22) PCT Filed: Mar. 13, 2022

(86) PCT No.: PCT/IT2022/050053
§ 371 (c)(1),
(2) Date: Aug. 24, 2023

(87) PCT Pub. No.: WO2022/195638
PCT Pub. Date: Sep. 22, 2022

(65) Prior Publication Data
US 2024/0035547 A1    Feb. 1, 2024

(30) Foreign Application Priority Data

Mar. 15, 2021    (IT) .................... 102021000006071

(51) Int. Cl.
*F16G 11/14*    (2006.01)
*H01H 3/02*    (2006.01)

(52) U.S. Cl.
CPC ......... *F16G 11/146* (2013.01); *H01H 3/0226* (2013.01)

(58) Field of Classification Search
CPC ............................ F16G 11/146; H01H 3/0226
See application file for complete search history.

(56) References Cited

U.S. PATENT DOCUMENTS

| 4,762,968 A * | 8/1988 | Hilton | H01H 27/00 |
| | | | 340/687 |
| 5,507,533 A * | 4/1996 | Mumma | F16L 55/005 |
| | | | 285/902 |
| 9,175,437 B2 | 11/2015 | Gamba et al. | |
| 10,220,225 B2 | 3/2019 | Gamba | |
| 10,480,703 B2 | 11/2019 | Gamba | |
| 2017/0248481 A1 | 8/2017 | Bubar et al. | |

(Continued)

FOREIGN PATENT DOCUMENTS

| EP | 2764155 B1 | 3/2017 |
| EP | 3154644 | 4/2017 |
| EP | 3368807 B1 | 4/2020 |

(Continued)

OTHER PUBLICATIONS

International Preliminary Report on Patentability for International Application No. PCT/IT2022/050053 filed Mar. 13, 2022 on behalf of Davide Gamba, dated Feb. 21, 2023 (18 pages).

(Continued)

*Primary Examiner* — David M Upchurch
(74) *Attorney, Agent, or Firm* — Steinfl + Bruno LLP

(57) ABSTRACT

Safety device with sliding cable, to secure an installation. The device includes a sliding cable with a first attachment eyelet and a second attachment eyelet formed by two end portions, of the sliding cable, respectively closed by a first sleeve and a second sleeve. The first and second attachment eyelet allow to attach and connect the device to two adjacent parts of the installation. The safety device further includes signaling and activation means.

9 Claims, 13 Drawing Sheets

(56) References Cited

U.S. PATENT DOCUMENTS

2018/0047523 A1\* 2/2018 Coursol ................... H01H 3/12
2019/0063659 A1\* 2/2019 Gamba ................ F16G 11/146

FOREIGN PATENT DOCUMENTS

WO  2013/051043 A2  4/2013
WO  2015/189867 A1  12/2015
WO  2017/072806 A1  5/2017

OTHER PUBLICATIONS

International Search Report and Written Opinion for International Application No. PCT/IT2022/050053 filed Mar. 13, 2022 on behalf of Davide Gamba, dated Jul. 5, 2022 (9 pages).

\* cited by examiner (a)

(b)

SLIDING CABLE SAFETY DEVICE FOR GENERATING AN ALARM SIGNAL

CROSS REFERENCE TO RELATED APPLICATIONS

The present application is the US national stage of International Patent Application PCT/IT2022/050053 filed on Mar. 13, 2022 which, in turn, claims priority to Italian Application No. 102021000006071 filed on Mar. 15, 2021.

TECHNICAL FIELD OF THE INVENTION

The present invention relates in general to the field of safety and more particularly to a useful new and innovative sliding cable safety device, i.e. including as an essential element a sliding cable, suitable for making safe a plant, an apparatus, a machine, a machinery, a machine, a pipe, a pipeline or a similar installation and structure, and for generating an alarm signal in the event of a fire, an explosion, a failure, an accident and in general an exceptional similar event in such a plant, apparatus, machine, machinery, piping, conduit or installation and similar structure, secured by the same sliding cable safety device.

The invention also relates to a corresponding method to secure a plant, an apparatus, a machine, a machinery, a pipe, a duct or an installation and similar structure, and more precisely to generate an alarm signal in the event of a fire, an explosion, a fault, an accident and in general an exceptional similar event in such a plant, apparatus, machine, machinery, piping, duct or installation and similar structure, so as to limit the damage and negative effects of such exceptional event.

Reference to and Incorporation of Previous Patent Applications in the Name of the Applicant For the sake of completeness of information, it is pointed out that in the same technical field of the present invention, i.e. of the safety and related safety devices, the Applicant is already the owner of numerous patent rights, as proof and confirmation of its constant research and commitment in this field, and in particular of the following patent rights:

Italian patent for invention No. 0001408513 entitled "COMPOSITE CABLE ROPE", filed on Oct. 4, 2011 and granted on Jun. 27, 2014;

Italian patent for invention No. 0001407882 entitled "LIFE LINE SYSTEM", filed on Oct. 4, 2011 and granted on May 23, 2014;

patents in Italy and Germany, and in many other European countries deriving from the validation of the European patent granted EP2764155 B1, entitled "COMPOSITE ROPE AND ANCHORING AND SAFETY SYSTEM", and corresponding U.S. Pat. No. 9,175,437 B2 entitled "HIGH-PERFORMANCE COMPOSITE CABLE ROPE AND ANCHORING AND SAFETY SYSTEM INCLUDING SUCH A COMPOSITE CABLE ROPE";

Italian patent for invention No. 1424510 entitled "SLIDING ROPE SAFETY DEVICE FOR ROOFS AND COVERS AND CORRESPONDING METHOD FOR DAMPING THE IMPACT AND STRESSES SUFFERED BY A USER WHEN ACCIDENTALLY PULLING THE ROPE OF A ROPE SAFETY DEVICE", filed on Jun. 10, 2014 and granted on Sep. 16, 2016;

U.S. Pat. No. 10,220,225 B2 and European Patent Application No. EP 3154644 A0, corresponding to the aforesaid Italian patent No. 1424510, entitled: "SLIDING ROPE SAFETY DEVICE FOR ROOFS AND THE LIKE, CORRESPONDING METHOD FOR DAMPING THE STRESSES ACTING ON A USER OF A ROPE SAFETY DEVICE AND GUARD RAIL WITH A SLIDING ROPE";

Italian patent for invention No. 102015000065572, entitled "NEW SLIDING CABLE SAFETY DEVICE FOR PIPES UNDER PRESSURE OR SIMILAR SYSTEMS OR EQUIPMENTS", filed on Oct. 27, 2015 and granted on May 8, 2018;

granted European patent EP 3368807 B1, entitled "INSTALLATION COMPRISING A SLIDING CABLE SAFETY DEVICE FOR CONDUITS OR SIMILAR EQUIPMENTS SUBJECT TO PRESSURE", corresponding to the above Italian patent No. 102015000065572 and validated in many European countries such as Germany, France, United Kingdom, Belgium, the Netherlands, Switzerland;

patents, still corresponding to the aforesaid Italian patent No. 102015000065572, in other numerous foreign countries, such as USA with No. U.S. Pat. No. 10,480,703 B2, China, Canada, Australia, New Zealand, INDIA, entitled "SLIDING CABLE SAFETY DEVICE FOR CONDUITS OR SIMILAR EQUIPMENTS SUBJECT TO PRESSURE AND CORRESPONDING INSTALLATION COMPRISING SUCH SAFETY DEVICE".

In particular, the safety device object of the present invention is an interesting and innovative application of the sliding cable safety device, as described and protected by the above-mentioned Italian patent No. 102015000065572, which application appears particularly suitable for safely placing pipes under pressure and similar installations and equipments which are subjected to high pressures in operation and therefore are potentially exposed to the risk of explosions and similar exceptional events.

It follows that to this previous Italian patent for invention No. 102015000065572, in the name of the same Applicant of the present patent for invention, it is possible to make reference and direct reference for any further information and any further data that can be useful for integrating and clarifying the content of the present patent application for invention.

Moreover, always in order to allow a complete and correct appreciation of the characteristics of the present invention, the entire content of this previous Italian patent for invention No. 102015000065572, owned by the Applicant, including the accompanying drawings, is incorporated in its entirety in the present patent application for invention.

For reasons of clarity, however, those parts already contained in the above-mentioned prior patent for invention will be again described and included in the following description, whereas they will be considered useful for understanding and appreciating in the most complete and exhaustive possible way the characteristics of the sliding cable safety device of the present invention, although this will involve repeating concepts and information already presented.

The State of the Known Art

As known to all, the safety field is a very wide and varied sector, which includes and involves many fields of the art and has long been the subject of continuous and progressive developments, in line with the expectations and needs of our society and the modern economy of increasing security, particularly in the environments in which people live and work.

In this general context and in order to satisfy and meet the above-mentioned requirements and expectations of an ever greater and more effective level of security, as well as in order to comply with the regulations which have been prepared and perfected over time by the various governmental authorities in order to ensure adequate safety conditions in the workplace and in civil life, the prior art has developed and currently proposes numerous solutions, safety devices and systems to secure the most diverse installations and structures, such as plants, equipments, machines, machinery, pipes, piping, conduits, others.

More specifically, these known solutions, systems and safety devices are very often configured to intervene and immediately activate the most appropriate measures, in the event of exceptional events which may involve and interest these installations and structures. in order to limit as much as possible the damage and adverse effects induced by these exceptional events.

For example, as it is known to all, the prior art currently proposes sophisticated and advanced fire safety systems capable of immediately detecting the emergence of a fire in one of the various installations and structures, listed above, and therefore of rapidly and automatically intervening to extinguish the flames, in order to put out the fire in the bud and therefore to prevent it from causing further damage.

Similarly, the prior art proposes numerous safety systems and devices able to intervene immediately and automatically, in the case of explosions, breakages, failures, accidents and similar destructive events during the operation of these installations, also in this case in order to limit as much as possible the damage and negative effects caused by these destructive events and therefore to prevent them from causing further considerable damage.

However, the various safety systems and devices currently known and adopted, although having a wide diffusion and obtained a good commercial success, are not to be considered completely and at all free from limits and drawbacks, such as for example a certain constructive complexity and a consequent not negligible cost, and in any case they leave room for further developments and improvements, in line with the demands and expectations of the market and in general of civil society of increasingly high security conditions, as well as of systems and safety devices exhibiting better performance or at least, for the same performance, a manufacturing cost lower than the current ones.

Furthermore, in this regard, it is pointed out that the news have, still recently, reported numerous accidents and tragic events that could have been avoided completely, or at least their most serious consequences could have been limited, if appropriate and effective security measures were available and applied and adopted.

In particular, there is mentioned the fire at the Thyssen-Krupp steel mill in Turin on 6 Dec. 2007, in which seven people died, whose consequences and effects, according to many experts and on the basis of the results of the investigations, could have been much less serious and devastating, if, at the time of the fire, an adequate safety system had intervened, capable of immediately interrupting the operation of the plant that had caught fire, in which case the fire would not have spread as it did and would not have caused all the deaths.

It follows that this tragic event, known to all, as unfortunately many others, including the numerous accidents at work reported by newspapers, poses the problem of defining and implementing, in line with the aims of the present invention, adequate safety measures and developing effective means and devices having the capacity, in the event of a failure, accident, fire and a similar destructive event to intervene immediately so as to immediately interrupt the operation of the plant, apparatus, machine and similar installation involved in such a destructive event, in order to limit as much as possible its consequences and negative effects.

Therefore, in the context as illustrated above, the inventor of the present invention has perceived that it was possible to go further and innovate with respect to the safety systems and devices currently offered by the art and in use, and in particular it was possible to improve the safety conditions in the places where there is installed a plant, apparatus, machine, pipes, piping and in general a similar installation or structure, subject, in operation, to the risk of a fire, explosion, breakage, failure, an accident and in general a similar exceptional destructive event, so as to limit as much as possible the damage caused by such an exceptional event.

SUMMARY OF THE INVENTION

Therefore a primary object of the present invention is to propose and realize a new, useful and effective safety device able to secure a plant, a machine, an apparatus, a pipe, a duct or an installation and similar structure, subject in the exercise to the danger and risk of breaking and/or exploding and in general of failing and having an accident, with this new safety device being able to overcome the limits and drawbacks of the safety devices currently known and offered on the market, as for example a certain constructive complexity and a not always simple and easy application.

Another object, linked to the primary one, of the invention is also to propose and realize a new safety device which constitutes an advantageous, useful and inventive application of the sliding cable safety device described and claimed by Italian patent No. 102015000065572, in the name of the same Applicant of the present patent for invention, entitled "NEW SLIDING CABLE SAFETY DEVICE FOR PIPES UNDER PRESSURE OR SIMILAR SYSTEMS OR EQUIPMENTS".

A further object of the invention, linked to the preceding ones, is also that of providing a safety device which implies a rapid, simple and easy assembly on a wide variety of installations, comprising plants, equipments and machines of various kinds, pipes, piping, other, to be made safe against fire, explosions, breaks, accidents and other similar exceptional events.

Yet another object of the invention is also to provide a safety device which is characterized by a great speed and effectiveness in signalling the occurrence of an exceptional event, such as a fire, an explosion, a break, a failure, an accident, other similar exceptional events, in a plant, an apparatus, a machine, a pipe, a duct or similar installation, in particular when it is in operation, in order to implement the most appropriate and suitable measures to limit as much as possible the damage caused by such an exceptional event.

Finally, a further object of the invention is also to provide a safety device which involves a manufacturing cost which is competitive with that of the safety devices currently available on the market.

The above objects can be considered as fully achieved by the sliding cable safety device, adapted to generate an emergency or alarm signal, exhibiting the features recited by the independent main claim 1, and by the method for securing a plant, apparatus, machine, pipe, a duct or a similar installation and structure, exhibiting the features recited by independent claim 10.

Particular embodiments of the sliding cable safety device and of the corresponding method for securing a plant, apparatus, machine, pipe, piping or a similar installation are further defined by the dependent claims.

Advantages of the Invention

As will become clear from the following description, the sliding cable safety device according to the present invention, able to generate an emergency or alarm signal if necessary, offers a series of relevant advantages, partly already illustrated above, among which there are mentioned the following purely by way of example:

- extreme ease and rapidity of application of the safety device with sliding cable, simply by attaching and connecting the two eyelets, formed at the ends of the same safety device, to two generic parts of a wide variety of installations and structures, to be put and placed in safety, comprising systems, equipments, machines and machinery of various kinds, pipes, piping, other ones;
- adaptability of the safety device to the specific configuration of the installation and structure to be made safe;
- great rapidity of intervention to signal and warn the occurrence of an exceptional event, such as a fire, an explosion, a break, a failure, an accident, other similar events, in a plant, an apparatus, a machine, a pipe, piping or a similar installation, in operation, so as to activate the most appropriate and suitable actions, such as in particular that of immediately interrupting and stopping the operation of the installation, aimed at preventing the exceptional event from causing further damage;
- a relatively low and competitive manufacturing cost, when compared to that of the safety devices, currently offered on the market, exhibiting the same or even lower performances as those of the device of the invention;
- a great constructive simplicity and consequently a maintenance at zero cost;
- an easy and rapid disassembly, in case of necessity, of the safety device from the plant, machine, or in general from the installation and structure on which it had previously been mounted;
- great reliability and a correct operation, without problems and anomalies, over time.

BRIEF DESCRIPTION OF THE DRAWINGS

These and other objects, features and advantages of the present invention will become apparent from the following description of some preferred embodiments thereof, given purely by way of non-limiting example with reference to the attached drawings, wherein.

Figure 1:
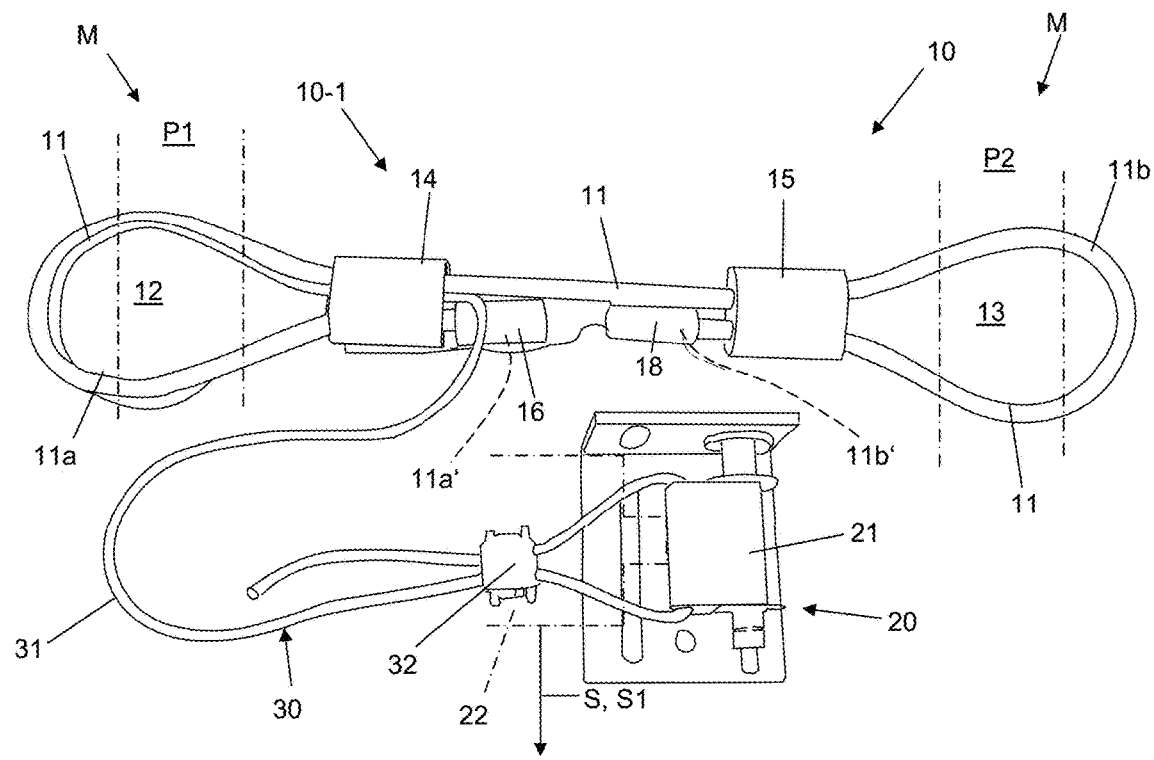
FIG. 1 is a photographic image showing a sliding cable safety device according to the present invention, in a first emergency embodiment, adapted to generate an alarm signal aimed at automatically blocking and interrupting the operation of a plant, a machine, machinery, an apparatus, a duct, a pipe, or a similar installation and structure, on which the safety device is mounted, in the event of a fire, an explosion, a break, an accident or a similar exceptional event in such installation and structure.
Figure 2:
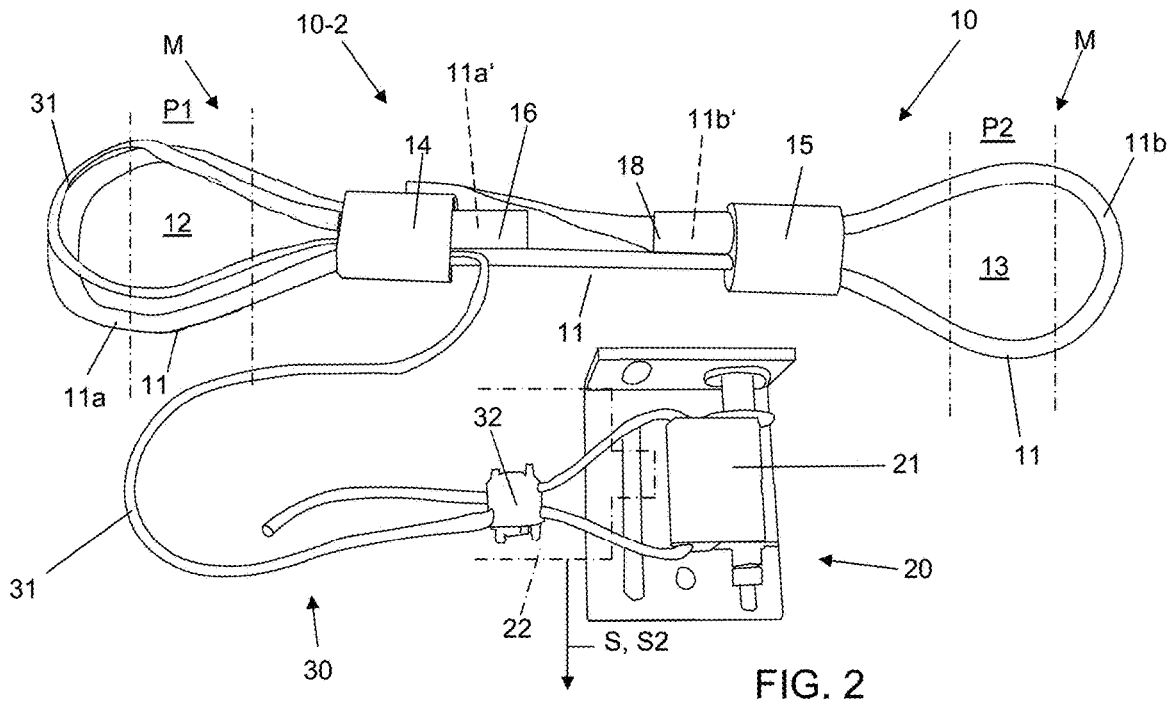
FIG. 2 is a photographic image showing the sliding cable safety device according to the present invention, in a second signalling embodiment, adapted to generate an alarm signal intended to signal only the occurrence of an exceptional event, such as a fire, an explosion, a rupture, an accident, in a plant, a machine, a machine, an apparatus, a duct, piping, or an installation and similar structure on which the safety device is mounted, wherein the operation of such installation and structure is automatically blocked and interrupted, if necessary, independently and autonomously from the safety device.

Of course, while still remaining within the scope and scope of the present invention, particular configurations, structures and characteristics, as described below with reference to its preferred embodiments, can be combined in any appropriate and consistent manner in one or more further embodiments of the same invention, that for synthesis reasons will not be described.

Furthermore, it is noted that the references used below only meet requirements of convenience and therefore they do not in any way define and limit the scope of the embodiments, which will be described, of the invention.

Description of Some Preferred Embodiments of the Sliding Cable Safety Device According to the Invention, Suitable for Generating an Alarm Signal As already specified, the present patent application for the invention makes direct reference and incorporates the content of the previous Italian patent for invention No. 102015000065572, owned by the Applicant, since it concerns and has as its object an interesting and advantageous application of the sliding cable safety device described and protected by such prior patent for invention.

This makes it possible to simplify, at least in some points, the description of the present patent application for invention, avoiding to describe in detail parts and the respective characteristics already clearly described in the above-mentioned Italian patent for the invention No. 102015000065572.

In any case, for the sake of clarity, those parts of the description, even if already contained in this prior patent for invention, capable of fully framing and clearly describing the sliding cable safety device of the present patent application for invention, will be repeated and described hereinafter.

Moreover, for reasons of clarity, the same reference numerals, already used in this prior patent for invention No. 102015000065572, in the name of the Applicant, will be kept, as far as possible, in the following description, to indicate the corresponding parts or the like, of course adding new reference numerals to describe the new parts characterizing the sliding cable safety device, object of the present patent application for invention.

With reference to the drawings, a safety device of the sliding cable type, according to the present invention, is indicated as a whole by 10, and is adapted to be mounted on a plant, an apparatus, a machine, a machine, a machine, a pipe, a duct, or on an installation and similar structure, to be made safe, also briefly referred to hereinafter as installation and generally designated with M, wherein this installation M is subject to the risk of exceptional events such as fire, explosion, breakage, failure, in the course of operation, various accidents and similar events.

Two preferred embodiments of the sliding cable safety device 10 according to the invention, which is suitable for being mounted on the installation M, will now be described, respectively a first embodiment, for emergency, indicated with 10-1, called emergency embodiment, and a second embodiment, for signalling, called signalling embodiment, indicated with 10-2.

First Emergency Embodiment of the Safety Device of the Invention

Figure 1A:
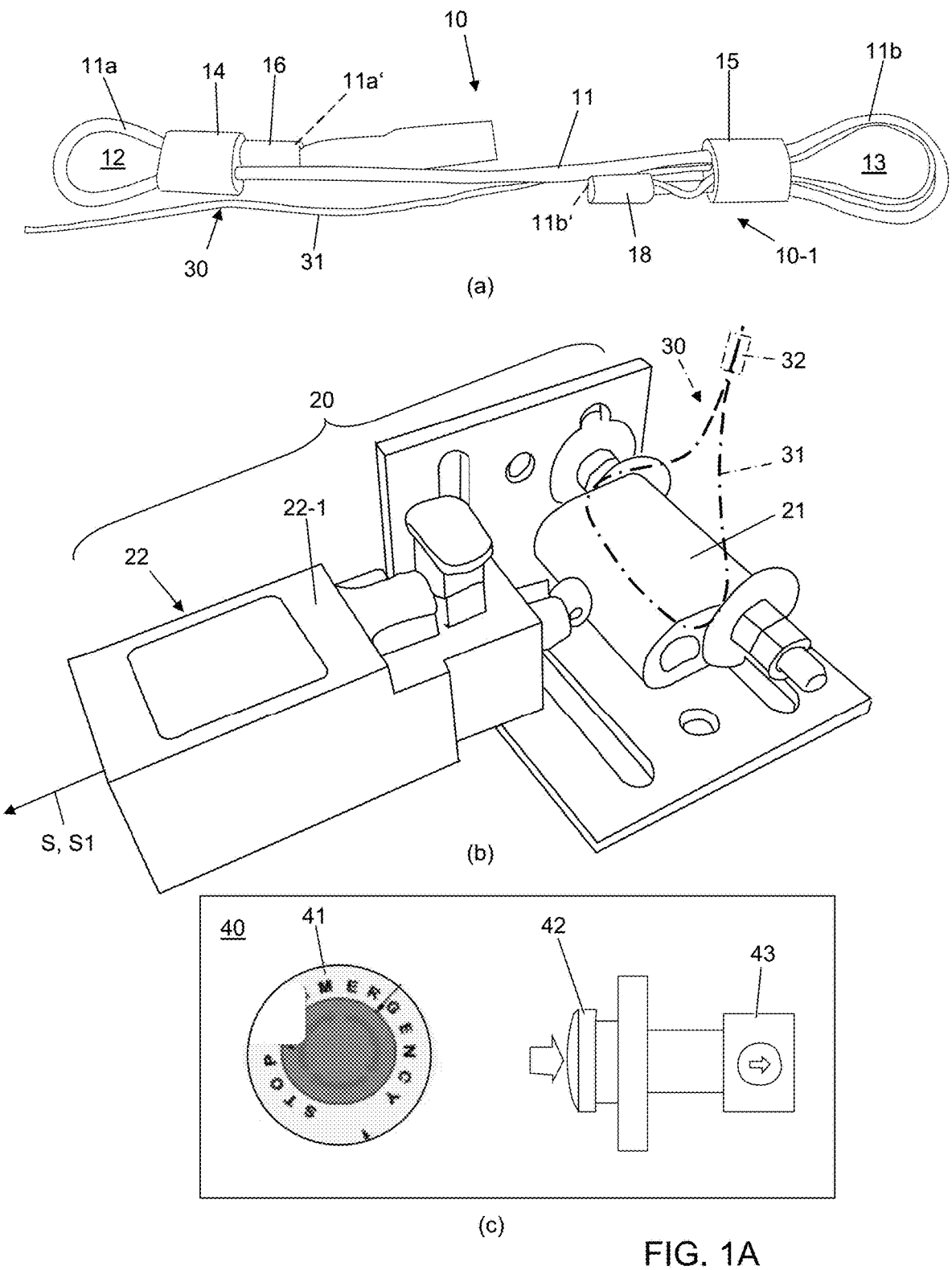
FIG. 1A, divided into sections (a)-(c), shows the essential parts and a functional diagram of the first embodiment of FIG. 1, of emergency, of the sliding cable safety device of the invention.
Figure 1B:
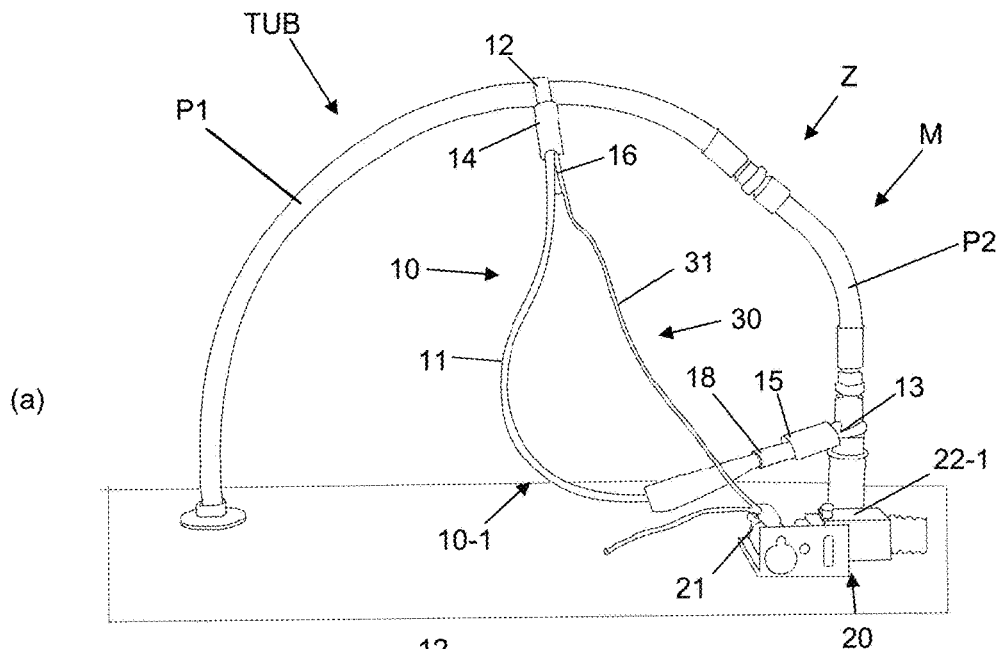
FIG. 1B, divided into sections (a)-(c), shows an example of application of the first embodiment of FIG. 1 of the sliding cable safety device of the invention to secure a flexible pipe or hose subject to a pressure in operation.
Figure 1B:
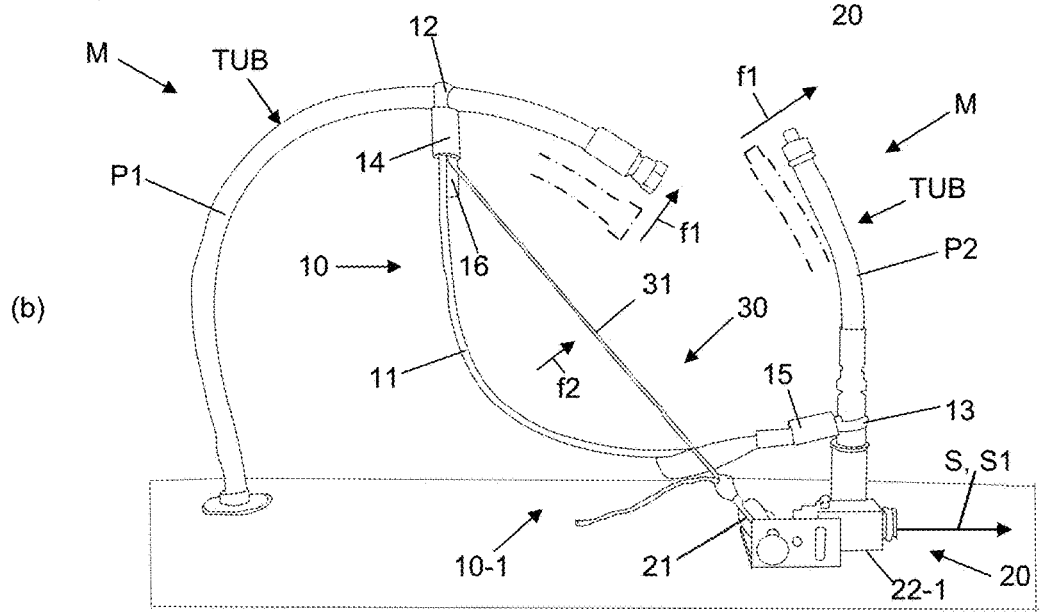
Figure 1B:
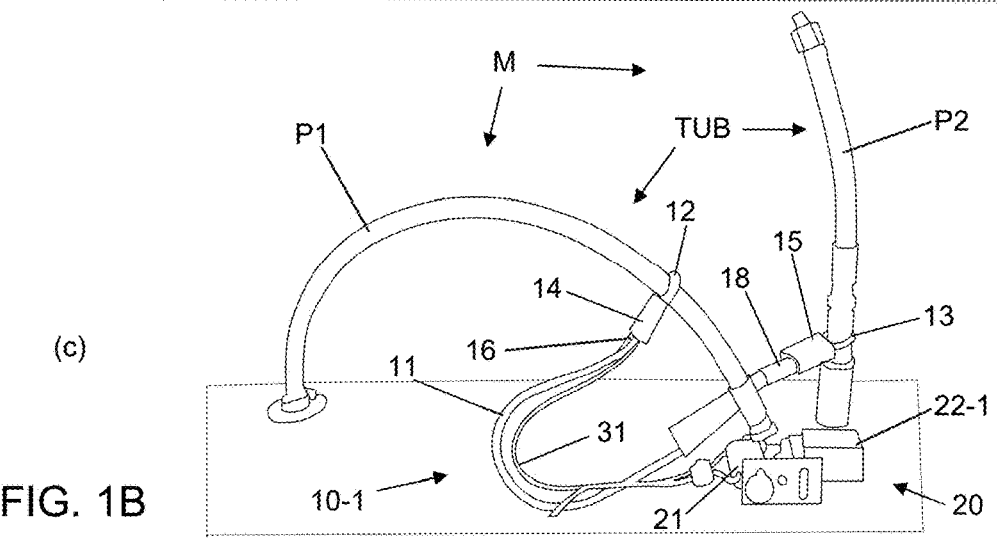
Figure 2A:
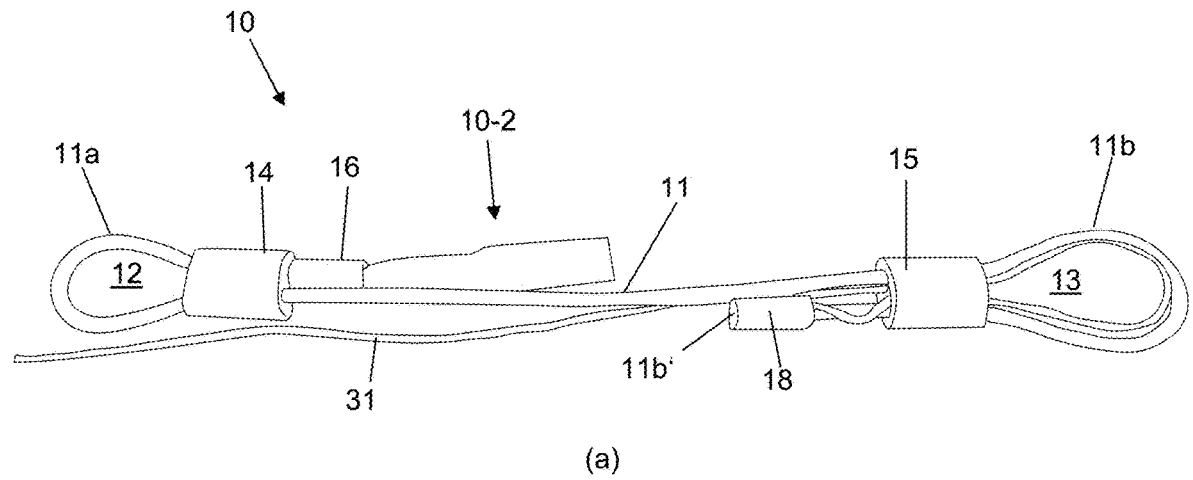
FIG. 2A, divided into sections (a)-(b), shows the essential parts of the second embodiment of FIG. 2, for signalling, of the sliding cable safety device of the invention.
Figure 2A:
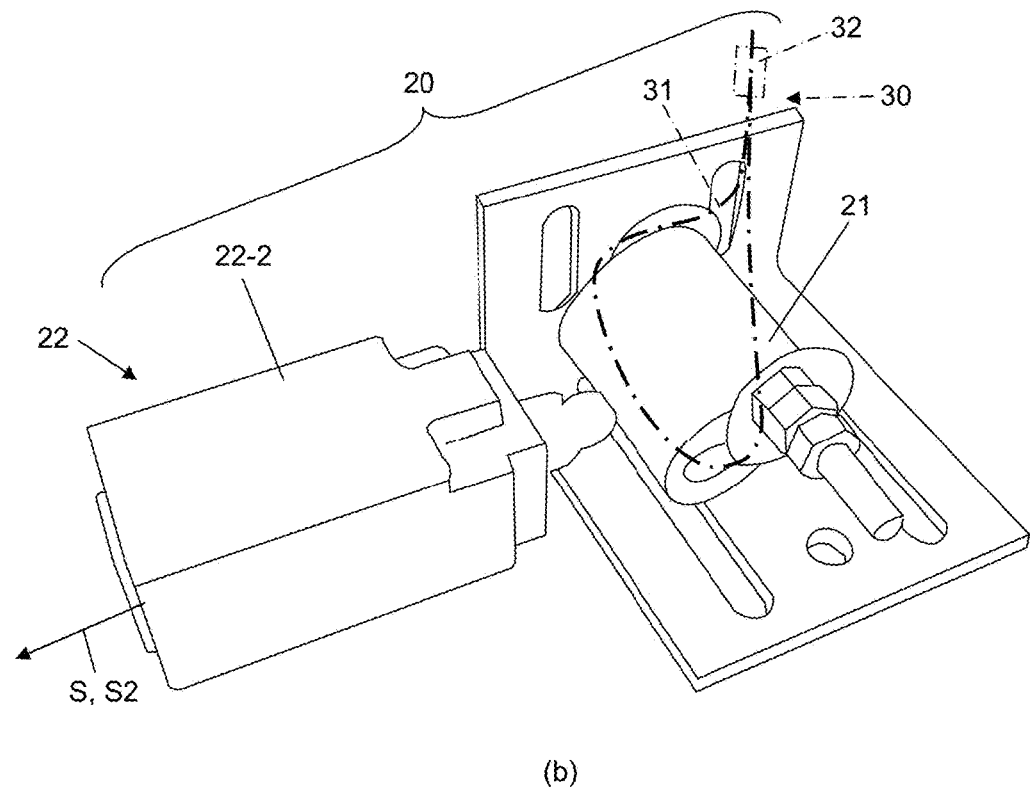
Figure 2B:
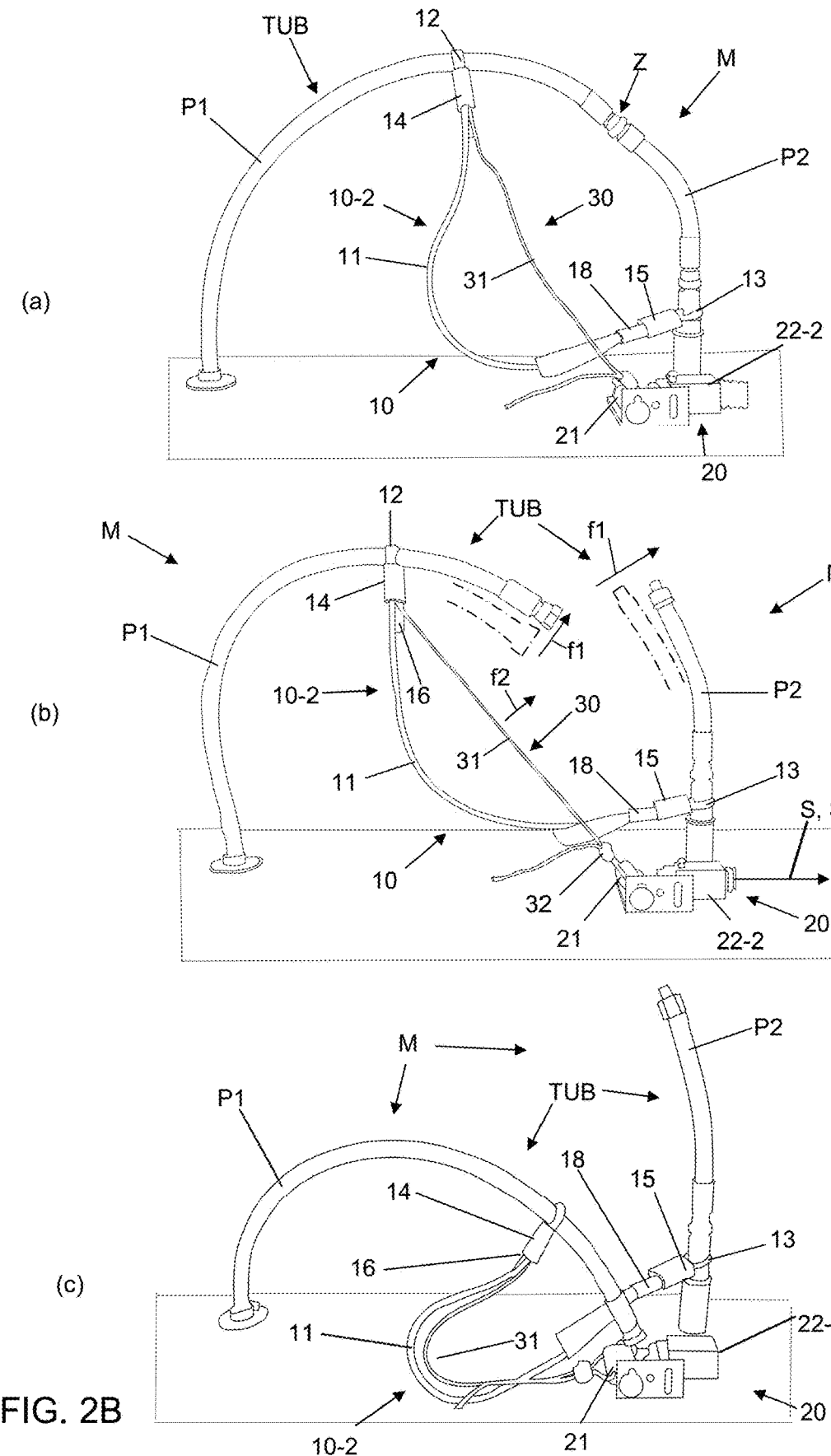
FIG. 2B, divided into sections (a)-(c), shows an example of application of the second embodiment of FIG. 2 of the sliding cable safety device of the invention for securing a flexible pipe or hose subject to a pressure in operation.

With reference to FIGS. 1, 1A and 1B of the drawings, the safety device 10-1, according to this first emergency embodiment comprises:
- a sliding cable, designated by the reference numeral 11, which has a first attachment eyelet 12 and a second attachment eyelet 13 formed respectively by two end portions 11a and 11b of the sliding cable 11;
- a first sleeve or ferrule 14 and a second sleeve or ferrule 15 which close the two end portions 11a, 11b of the sliding cable 11 so as to form, at the two opposite ends of the safety device 10, respectively the first attachment eyelet 12 and the second attachment eyelet 13; and
- two terminals 16, 18 provided at the two opposite ends 11a', 11b' of the sliding cable 11 included in the safety device 10-1.

The sliding cable 11 can be made in various ways and have various configurations, and more preferably it can be made in a manner and have a configuration in accordance with those described in the above-mentioned patents in the name of the Applicant.

In particular, the sliding cable 11 can have a composite layer structure, characterized by an inner core consisting of steel braided wires, at least one layer formed by Kevlar braided wires, or aramid fibers, which covers the inner metal core, and an outer layer formed by polyester yarns, such as the layered composite cable described in the European patent EP 2764155 B1, corresponding to the Italian patent No. 102015000065572 incorporated into the present invention patent application, wherein this layered composite cable has experimentally shown to have exceptional properties and performances which can be advantageously used in the field of safety.

As described in the above patents, this sliding cable 11, having an internal steel core, can be made with various types of coating layers of different materials, as indicated below:
- steel core+first Kevlar coating layer+second polyester coating layer;
- steel core+first polyester coating layer+second polyester coating layer;
- steel core+first dyneema coating layer+second polyester coating layer;
- steel core+composite textile fiber coating in different percentages among polyester, Kevlar, dyneema and other fibers.

In greater detail, the two sleeves 14 and 15 which close the two end portions 11a, 11b of the sliding cable 11 so as to form, at the two opposite ends of the safety device 10-1, the first and second coupling eyelets 12, 13, are suitably calibrated so as to slidably house the sliding cable 11 and therefore allow the latter to slide in these two sleeves 14 and 15.

Therefore, as better illustrated hereinafter, by describing the use and operation of the safety device 10-1, the respective first attachment eyelet 12 and the respective second attachment eyelet 13 allow to attach and connect the safety device 10-1, at its two opposite ends, to two parts, indicated by P1 and P2, of the plant, apparatus, machine, machinery, duct, pipe, or a similar installation and structure M, by making the sliding cable 11 to slide into the first and second sleeve 14 and 15 so as to push the two terminals 16, 18, provided at the two opposite ends 11a, 11b of the sliding cable 11, to cooperate in contact with the first and second sleeves 14 and 15 respectively, and thereby clamp the two eyelets 12 and 13 around these two parts P1 and P2 of the plant, apparatus, machine, machinery, pipeline, pipes, or a similar installation and structure M, to be secured by means of the same safety device 10-1.

These two parts P1 and P2 of the installation M, on which the safety device 10-1 is mounted, are schematized with a dashed and dotted line in FIG. 1 and are for example constituted and represented in FIG. 1B by two parts P1 and P2, connected to each other in a connection zone Z, of a flexible pipe TUB subjected in operation to the pressure of a fluid, such as air or oil, which flows in the same pipe TUB.

It is also clear that the pressurized pipe TUB is only one example, i.e. it constitutes only one of the possible installations and structures M which can be secured by the safety device 10-1, so that the latter can be mounted on a plurality of other installations and structures. as already pointed out above.

Therefore, still as illustrated hereinafter, the safety device 10-1, once mounted on the installation M, is able to intervene to retain and hold by the sliding cable 11 the two parts P1 and P2, to which the safety device is attached, of the installation M made safe by the same safety device 10-1, when one of the exceptional events above mentioned occurs, such as a fire, an explosion, a break, others, which can involve the installation M.

Moreover, the sliding cable safety device 10-1, according to this first embodiment, further comprises, as salient and essential parts which characterize and distinguish the application corresponding to this sliding cable safety device 10-1 with respect to the sliding cable safety device described by patent No. 102015000065572:

signalling means, generally designated by the reference numeral 20, adapted to generate, when necessary, an alarm signal S; and activation means, generally designated by the reference numeral 30, which connect at least a part of the sliding cable 11, included in the safety device 10-1, to the signalling means 20, in order to activate the alarm signal S generated by the same signalling means 20.

For example, as shown in the drawings, these activation means 30 are constituted by an activation cable or cord, designated by the reference numeral 31, which connects one of the two terminals 16 and 18 of the sliding cable 11 to the signalling means 20.

It is clear, however, that the connection between the sliding cable 11 and the signalling means 20 can be conveniently provided both by means of a plurality of means different from the activation cord 31 and in a plurality of different ways, for example, by connecting one end of the activation cord 31 to other areas of the sliding cable 11 different from the respective terminals 16 and 18, depending on the context in which the safety device 10 is mounted on the installation M, wherein all these possible different means and ways for connecting the sliding cable 11 and the signalling means 20 to each other are within the scope of the invention.

The signalling means 20 in turn comprise:

a cam 21, or a similar member, connected to one end of the activation cord 31, opposite to that connected to the sliding cable 11, so that the cam 21 is able to be actuated and controlled by the activation cord 31; and a switch or similar device, generally designated by the reference numeral 22, adapted to be activated by the cam 21, in turn controlled by the activation cord 31, in order to generate the alarm signal S.

The connection between the cam 21 and the end of the activation cord 31 can be made in various ways and for example, as shown in FIG. 1, by inserting an end portion of the activation cord 31 into a through hole of the cam 21 and then forming with this end portion an eyelet closed by a stop cord 32.

In particular, the switch 22, included in the signalling means 20, is a manual reset position switch, indicated with 22-1, usually available in the commerce, also called microswitch, in which the alarm signal S, generated by such manual reset position switch 22-1, is used as an emergency and blocking signal, indicated by S1, to directly and automatically block the operation of the installation M, on which the safety device 10-1 is mounted, in the event of a breakage, explosion, failure, accident or an exceptional similar event, as mentioned above, in such installation M, as described in greater detail below.

For the sake of completeness, FIG. 1A—section (c) schematically shows a control panel, generally indicated 40, adapted to allow an operator to control and interface with the safety device 10-1, wherein this control panel 40 has:

a setting knob 41 to allow the operator to set different functions of the safety device 10-1; and a stop button 42, associated with a blocking mechanism 43, to allow the operator to stop the operation of the safety device 10-1.

Figure 3:
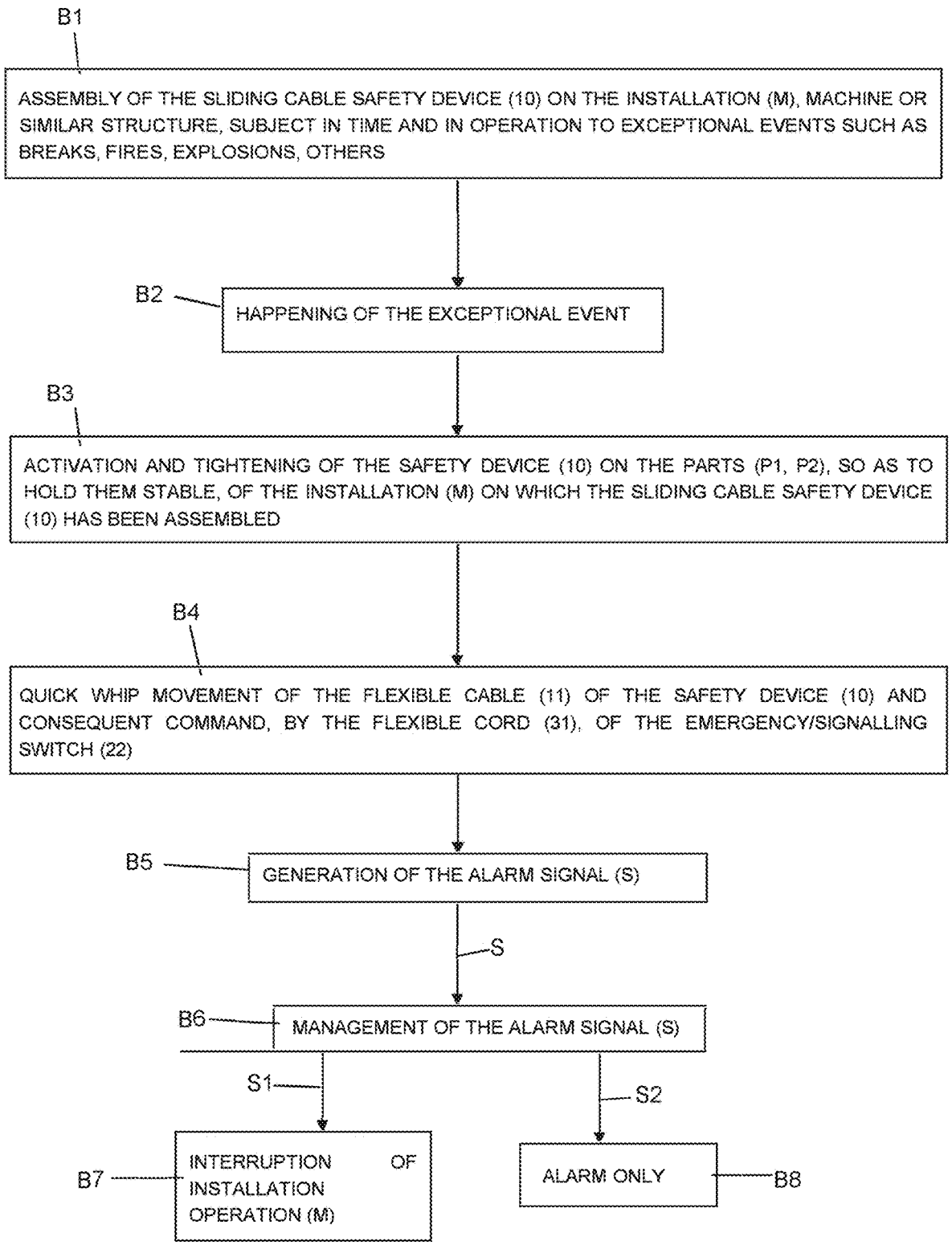
FIG. 3 is a block operating diagram illustrating the use and operation of the sliding cable safety device of the invention.

Use and Operation of the Sliding Cable Safety Device According to the First Embodiment With reference to the photographic images of FIG. 1B and to the block operating diagram of FIG. 3, the safety device 10, according to the respective first embodiment is initially mounted on an installation M to be secured, for example consisting of a flexible pipe TUB in which a pressurized fluid flows, connecting and attaching the two eyelets 12 and 13 of the safety device 10-1 to two adjacent generic parts, indicated with P1 and P2 and connected to each other in a zone Z of the pipe TUB, which are subject to the risk of separating, or in any case to be subject to a rapid and sudden movement, during the course of the time and of the operation of the pipe TUB itself, due to and following an exceptional and unexpected event, such as for example an explosion caused by an excessive pressure of the fluid flowing in the pipe TUB, a break in the connection zone Z between these two parts P1 and P2, another failure or accident or a similar event involving the pipe TUB.

In greater detail, as shown in FIG. 1B—section (a) and indicated by block B1 of the diagram of FIG. 3, in this initial step of mounting the safety device 10-1 on the pipe TUB, the two eyelets 12 and 13, formed at the ends of the safety device 10-1, are connected and attached to these two generic adjacent portions P1 and P2 of the pipe TUB, by making the sliding cable 11 to slide into the first and second sleeves 14 and so as to push the two terminals 16 and 18, provided at the two opposite ends 11a and 11b of the same sliding cable 11, to cooperate in contact with the first 14 and with the second sleeve 15, and thereby clamp the two eyelets 12 and 13 around these two parts P1 and P2 of the pipe TUB to be secured.

As shown in FIG. 1B—section (a), in this initial assembly configuration, both the sliding cable 11, able to slide in the two sleeves 14 and 15, connecting the two parts P1 and P2 of the installation M or of the pipe TUB secured by the safety device 10-1, both the activation cord 31 connecting a part of the sliding cable 11 to the cam 21 of the signalling means 20, can have and exhibit a loose configuration.

Therefore, when subsequently, in the use of the safety device 10-1, a breakage, an explosion, a failure, an accident or an exceptional similar event occurs in the pipe TUB secured by the same safety device 10-1, as indicated by the block B2 of FIG. 3, the parts P1 and P2 of the pipe TUB, to which the safety device 10-1 is connected and attached to the ends by means of the eyelets 12 and 13, are subject to a sudden and rapid movement due to the occurrence of this exceptional event.

For example, as indicated by arrows F1 and shown by dashed and dotted lines in FIG. 1B—section (b), this exceptional event causes the separation, in the connection zone Z, of the two parts P1 and P2 of the pipe TUB.

It also follows that, as a result of this exceptional event which causes the separation of the two parts P1 and P2, both the sliding cable 11, connected to the ends and therefore integral with these two parts P12 and P2 of the pipe TUB, and the activation cord 31, which connects the same sliding cable 11 to the cam 21 of the signalling means 20, are subject to sudden and rapid movement with a movement that resembles in some way that of a whip.

In this way, as indicated by the block B3 of FIG. 3, the sliding cable 11, of the safety device 10-1, connected to these two parts P1 and P2 of the pipe TUB, intervenes promptly to retain and hold them, once separated due to the exceptional event, to prevent them from flagging and moving in an uncontrolled manner and therefore cause further damage.

Moreover, in the same time, again due to this exceptional event which causes a sudden whip-like movement of the sliding cable 11 of the safety device 10-1, the respective activation cord 31 is tensioned, i.e. it assumes a stretched configuration from the initial loose configuration, as indicated by an arrow F2 and shown in FIG. 1B—section (b), so as to control the cam 21 which in turn controls the switch 22 of the signalling means 20, and thereby generate the alarm signal S1, as indicated by blocks B4 and B5 of FIG. 3.

In particular, in this first embodiment 10-1 of the sliding cable safety device of the invention, the alarm signal S1 generated by the switch 22 is used as an emergency signal to immediately block the operation of the installation M, or to interrupt the flow of fluid in the pipe TUB, as indicated by blocks B6 and B7 of the diagram of FIG. 3.

FIG. 1B—section (c) shows the pipe TUB, after the safety device 10-1 has intervened to interrupt the flow of the pressurized fluid in the pipe TUB, with the respective parts P1 and P2 in a slack configuration.

Second Signalling Embodiment of the Safety Device of the Invention

The second preferred embodiment 10-2 of the sliding cable safety device of the invention is substantially identical to the first embodiment 10-1, whereby for reasons of synthesis it will not be described in detail, and it is distinguished only from this first embodiment 10-1 by the type of the switch 22, included in the signalling means 20, which activates the alarm signal S, and by the management of such alarm signal S.

In particular, in this second embodiment 10-2 of the sliding cable safety device 10 of the invention, the switch 22 is constituted by a non-manual reset switch, or position switch without manual reset, designated by 22-2, and the alarm signal S generated by such non-manual reset switch 22-2 is used and managed only as an alarm signal, indicated with S2, i.e. to signal the occurrence of the exceptional event, such as fire, explosion, breakage, others, which involved the installation M on which the sliding cable safety device 10-2 is mounted and has therefore caused the movement of the sliding cable 11 with the consequent activation of the signal S2, whereby this alarm signal S, generated by the non-manual reset switch 22-2, is not used to interrupt and block the operation of the same installation M.

Use and Operation of the Sliding Cable Safety Device According to the Second Embodiment Also the use and operation of this second signalling embodiment 10-2 of the sliding cable safety device of the invention are similar and comparable to those of the first emergency embodiment 10-1, whereby, for reasons of synthesis, they will not be illustrated in detail, being clearly deducible from the previous description of the first embodiment 10-1.

It is only pointed out that, in this second embodiment 10-2, the signal S generated by the switch 22, included in the signalling means 20, is used and managed solely like an alarm signal S2, as indicated by the blocks B6 and B8 of FIG. 3, to signal the occurrence of the exceptional event that triggered and caused the same alarm signal S, but it is not used and managed to block the operation of the installation M in which the exceptional event occurred.

Consistently with this use of the alarm signal S, while in the first emergency embodiment 10-1 of the safety device 10, the micro-switch 22-1 is adapted to be opened and positively rearmed by an operator, in compliance with the emergency regulations, in the second embodiment 10-2, of the safety device 10, the micro-switch 22-2 is not of the type adapted to be manually rearmed.

Figure 4A:
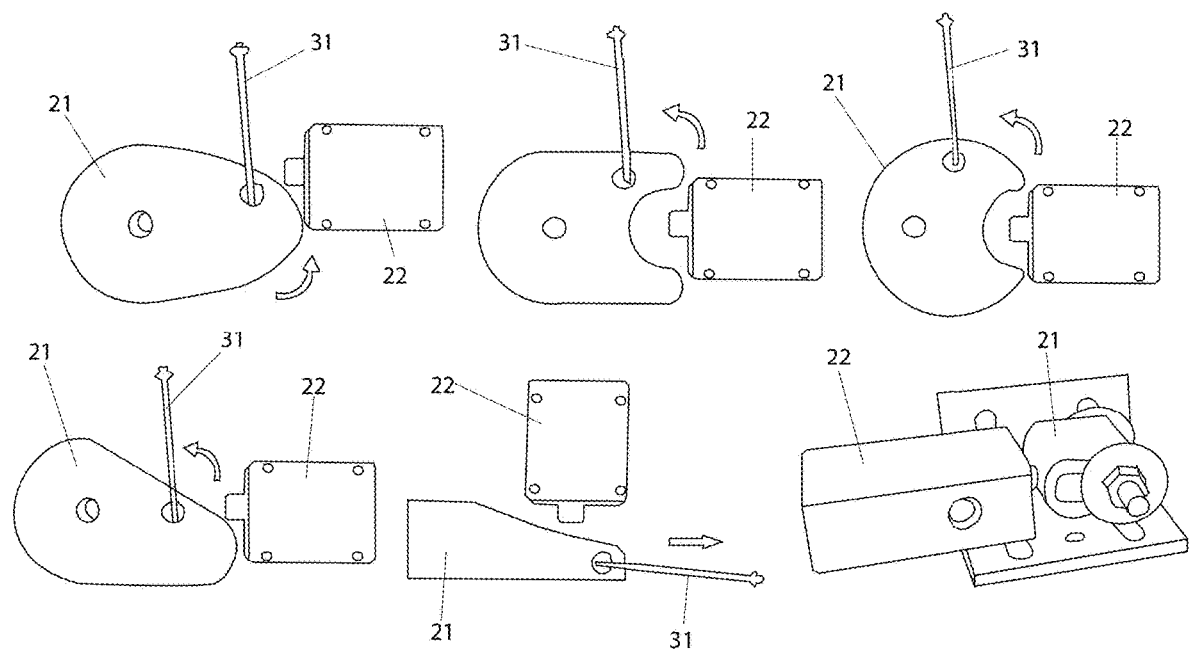
FIGS. 4A-4B are a series of further photographic diagrams and images, integrating the previous figures, of the two embodiments of the sliding cable safety device of the invention.
Figure 4A:
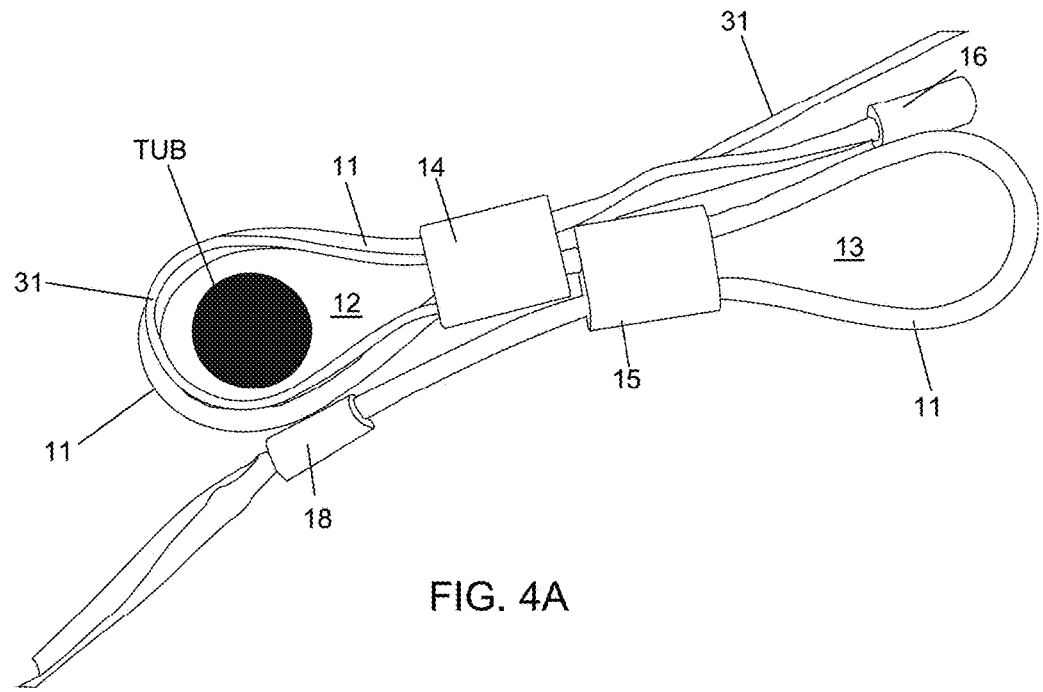
Figure 4B:
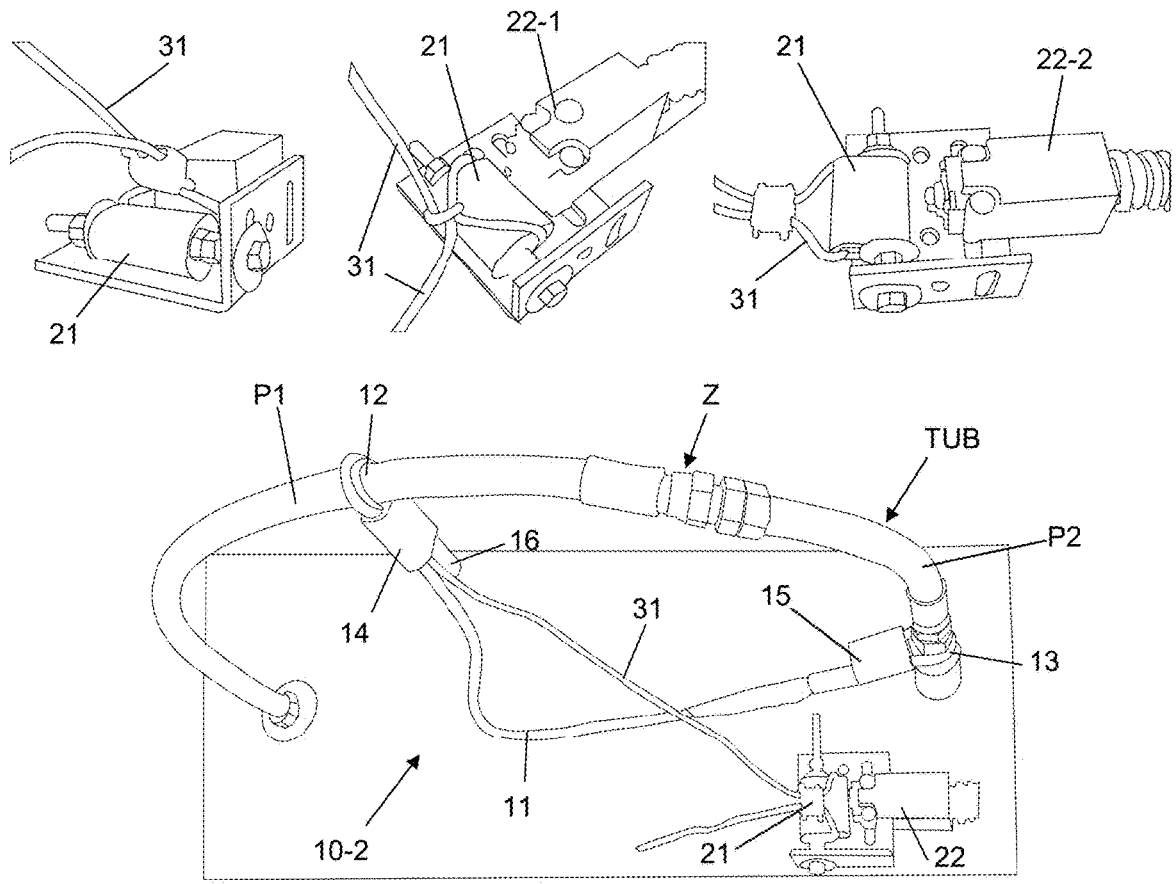
Figure 4B:
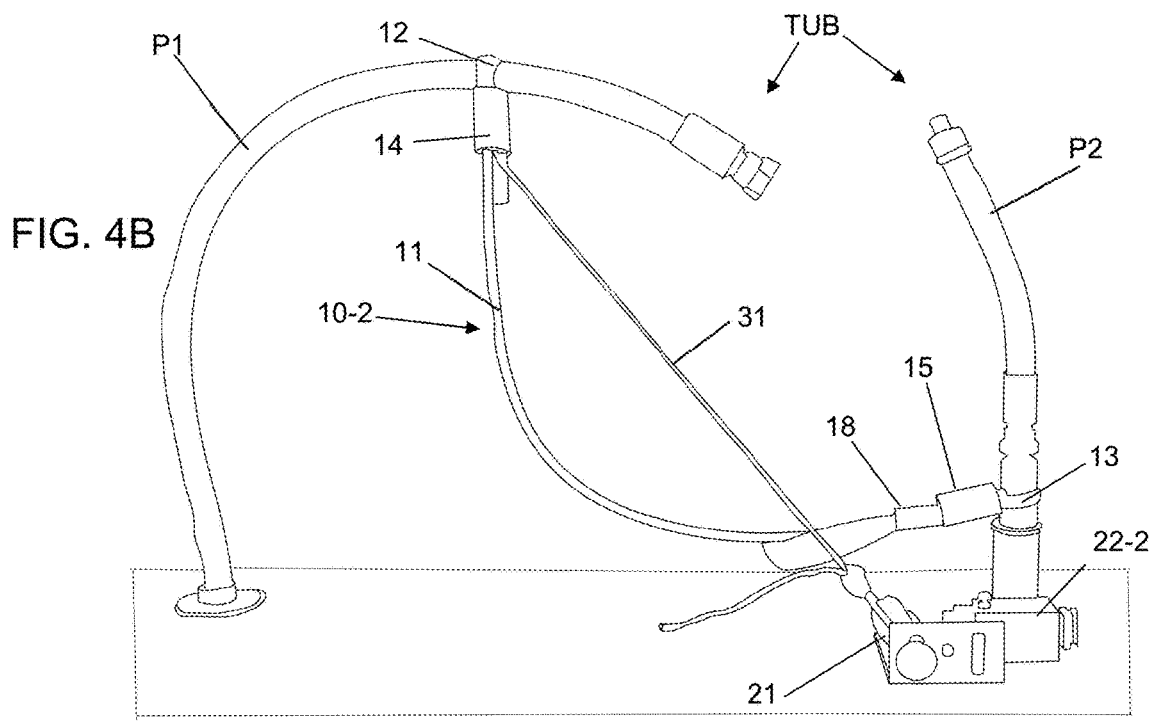

Finally, for a more complete and precise information, FIGS. 4A-4B show, in addition to the other figures of the drawings, some further schematic views and photographic images, clear and evident in themselves so as to not require to be illustrated and explained in detail, of the two embodiments 10-1 and 10-2 of the sliding cable safety device 10 of the invention, with these further graphic views referring to different types and configurations of the cam 21 which is controlled by the activation cord 31 and in turn controls the switch 22 to generate the alarm signal S.

It is therefore clear from the description that the present invention fully achieves the intended aim and objects, and more specifically proposes a new and useful safety device, of the sliding cable type, able to be advantageously applied to give and provide a high level of safety, in a simple and practical way, in a wide range of installations and structures, and in particular to immediately block and stop, in the event of a disastrous exceptional event such as an explosion, fire, or a break in the installation and structure secured by the sliding cable safety device, the operation of the same installation and structure, as well as to promptly signal the occurrence of such an exceptional event, so as to promptly and without delay activate the measures and actions necessary to remedy it.

Variants

Naturally, without prejudice to the basic principle and concept of the present invention, it is also clear that the sliding cable safety device can be subject to variations, modifications and improvements, concerning both its technical characteristics and the operative context in which it can be used, with respect to what has been described and illustrated heretofore, without departing from the scope of the invention itself.

For example, the sliding cable safety device of the invention can have a different configuration and means, although functionally equivalent, with respect to the two eyelets 12 and 13 described with reference to embodiments 10-1 and 10-2, to allow the device to be attached and connected at its ends to the installation to be secured.

In particular, within the scope of these variants, the sliding cable safety device can have only one eyelet, at a first end, and suitable connection means other than an eyelet, at the other end, to allow the same device to be connected to the parts of the installation to be secured, wherein, if necessary and in case of emergency, the rapid and immediate movement of the cable of the safety device activates an electrical signal which in turn causes the interruption of the operation of the installation made safe by the device.

Also the signalling means which, in case of intervention of the safety device, are activated to generate the electrical signal aimed at interrupting the operation of the installation can have a different configuration, even if functionally similar, from that of a conventional switch.

In this context, as in the example shown in FIG. 6, below illustrated, the signalling means can be associated and be part of the machine, machinery, apparatus, installation or similar structure, to be secured, and the sliding cable device can have, at one end, instead of an eyelet formed by the flexible cable, a bayonet coupling able to be inserted and connected directly to these signalling means, integrated in the machine that has been secured, in order to activate them, if necessary, to interrupt the electrical supply and therefore instantly block the operation of the same machine, when the bayonet is detached from the latter due to the sudden backward movement of the cable of the device.

The two sleeves 14 and 15, of metal or plastics, which close and form the two eyelets 12, 13 at the ends of the safety device 10, can also assume various shapes and configurations.

Figure 5:
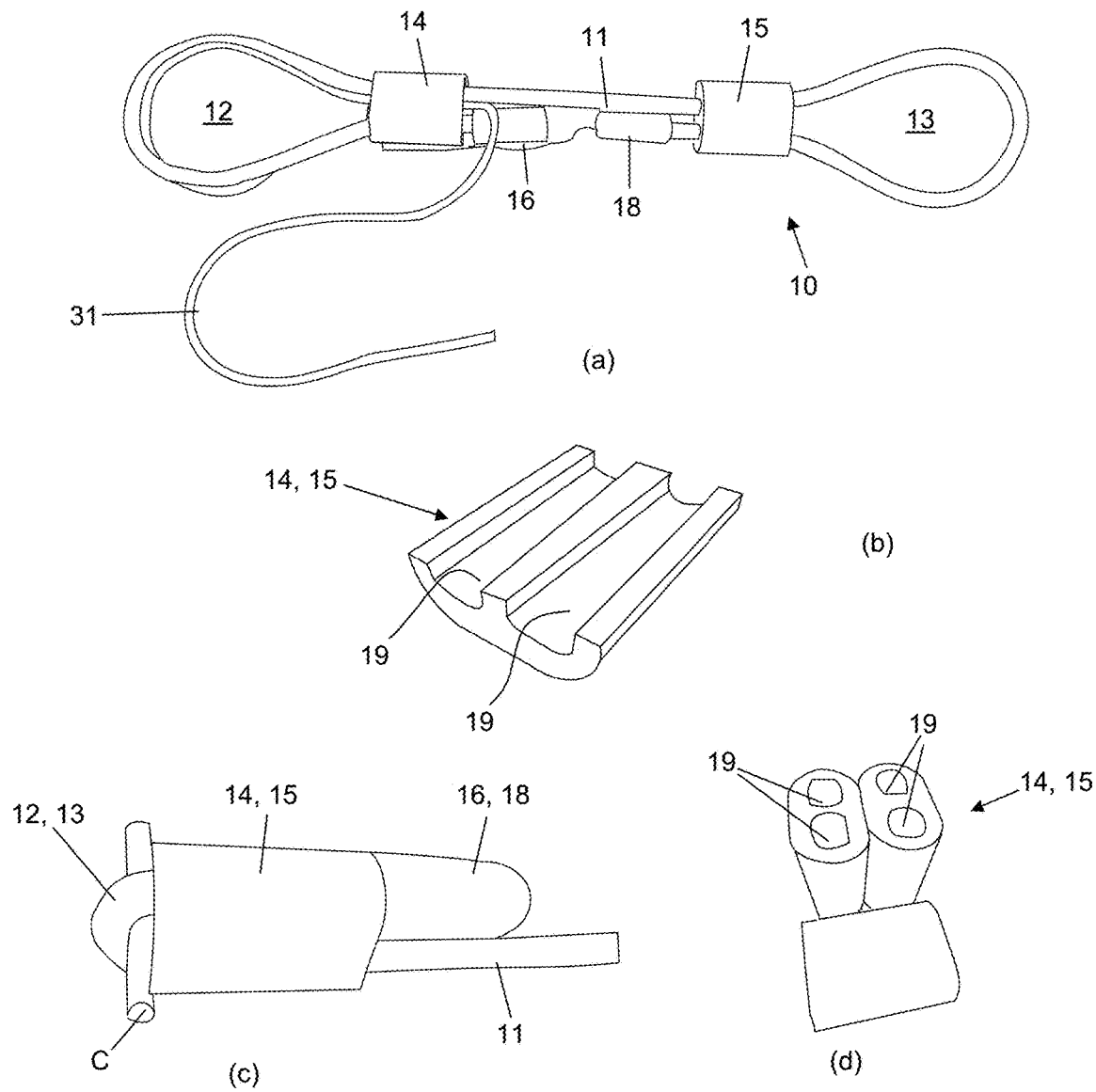
FIG. 5, divided into sections (a)-(d), is a further series of photographic diagrams and images aimed at showing and highlighting the features that qualify and configure the sliding cable safety device of the invention, in particular as a Personal Protective Equipment or PPE adapted to satisfy the current regulations.
Figure 5A:
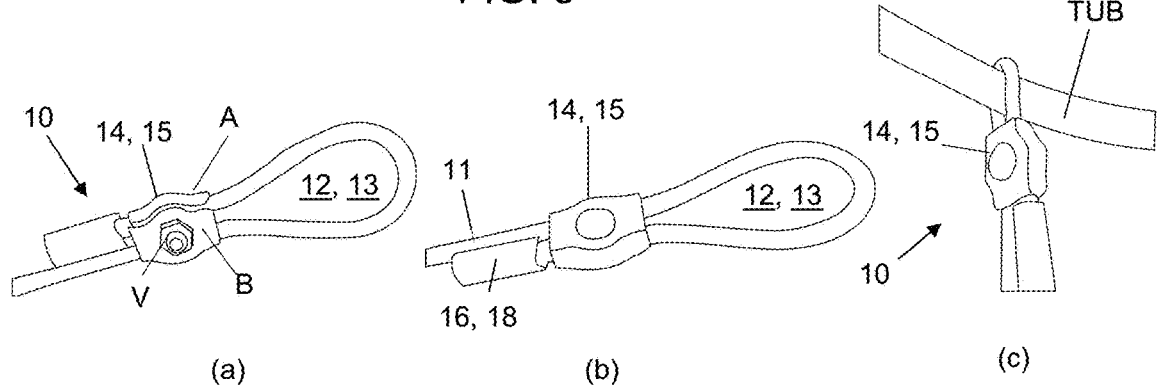
FIG. 5A, divided into sections (a)-(c), is a series of photographic images of a variant of a detail, consisting of a sleeve, of the sliding cable safety device of the invention.

For example, as shown by the photographic images of FIG. 5A, sect. (a)-(c), each sleeve 14, 15, instead of being made up of a single piece, can be formed by two parts A and B, connected and fixed to each other by a central screw V, wherein this variant of the sleeve 14, 15 has the advantage of allowing the safety device 10 to be mounted to the installation to be secured, for example to a pipe TUB, without having to detach and disconnect this installation.

The Conformity of the Sliding Cable Safety Device of the Invention with the Community Rules on PPE (Personal Protective Equipments)

Finally, for a complete information, it is pointed out that the sliding cable safety device 10 of the present invention, in the various embodiments illustrated above, therefore characterized by an additional cord or cable 31 adapted to activate, if necessary, a micro-switch 22, which in turn is adapted to generate in response an alarm signal S, that can be used for example to stop the system or apparatus secured by the sliding cable device itself, it is properly configured as a Personal Protective Equipment or PPE, i.e. as a protection device capable of complying with the "REGULATION (EU) 2016/425 OF THE EUROPEAN PARLIAMENT AND OF THE COUNCIL of 9 Mar. 2016 on personal protective equipments".

More in detail, in accordance with and in compliance with the aforementioned European Regulation on personal protective equipments or PPE, which specifically prescribes that a PPE must not be modifiable, the sliding cable safety device 10 of the present invention has the following characteristics and performances:
  a sleeve 14, 15, made of composite plastic material, having a configuration characterized by two through holes indicated with 19, distinct and separated from each other, slightly conical, as shown in FIG. 5—section (b), so as to prevent the sleeve 14, can come out of the safety device 10 and therefore also prevent the same safety device 10 from being improperly modified;
  a calibrated conical configuration of the two through holes 19 of each sleeve 14, 15, wherein this calibrated conical configuration is adapted both to prevent the sleeve 14, from coming out and to exert, in case of intervention of the safety device 10 to retain the parts P1 and P2 of the installation M to which the safety device 10 is attached to the ends, an appropriate braking action on the flexible cable 11 which slides in the two sleeves 14, 15 and consequently also a damping action of the vibrations which tend to trigger during such intervention;
  possibility of blocking even very small objects, such as a nail C, by means of the safety device 10, as shown in FIG. 5—section (c);
  a suitable, in particular cylindrical, shape of each terminal 16, 18, also referred to as end stop, suitable to not allow the sliding cable 11 to be removed from the sleeves 14, 15 or even that they can only suddenly become loose;
  a solid and stable crimping, at the two opposite ends 11a' and 11b' of the sliding cable 11, of the two terminals 16 and 18, typically made of aluminium, having, as said, the function of preventing the sliding cable 11 from being removed from the sleeves 14 and 15 and/or even becoming loose, wherein, in particular, this crimping is carried out with a pressure of between 250 and 500 tons as a function of the diameter of the sliding cable 11, so as to generate heat which, if the sliding cable 11 has a composite layer structure with an outer layer of polyester, is such as to melt this polyester outer layer coating, whereby the two aluminium terminals 16 and 18 form a whole with the respective ends 11a' and 11b' of the sliding cable 11.

It follows that the sliding cable safety device 10 of the invention is adapted to fully comply with the aforesaid European PPE Regulation, so as to be advantageously used both as PPE of first category, i.e. to protect the individual from minimum risks such as mechanical surface injury, and as PPE of third category, i.e. to protect the individual from major and more dangerous risks, such as being hit by a high pressure jet, which can cause very serious consequences such as death or irreversible damage to his health.

In addition, the same safety device 10 complies with the following European PPE Directives:
  ATEX Directive 2014/34/EU OF THE EUROPEAN PARLIAMENT AND OF THE COUNCIL of 26 Feb. 2014 on protective equipment and systems intended for use in potentially explosive atmospheres;
  Directive MACHINERY 2006/42/EC OF THE EUROPEAN PARLIAMENT AND OF THE COUNCIL of 17 May 2006 on machinery and emergency systems, in particular with reference to the following points 7 and 10 of that Machinery Directive:
  7. Guards and protective devices designed to protect exposed persons against the moving parts involved in the machine working process.
  10. Emergency Stop Devices.

Figure 6:
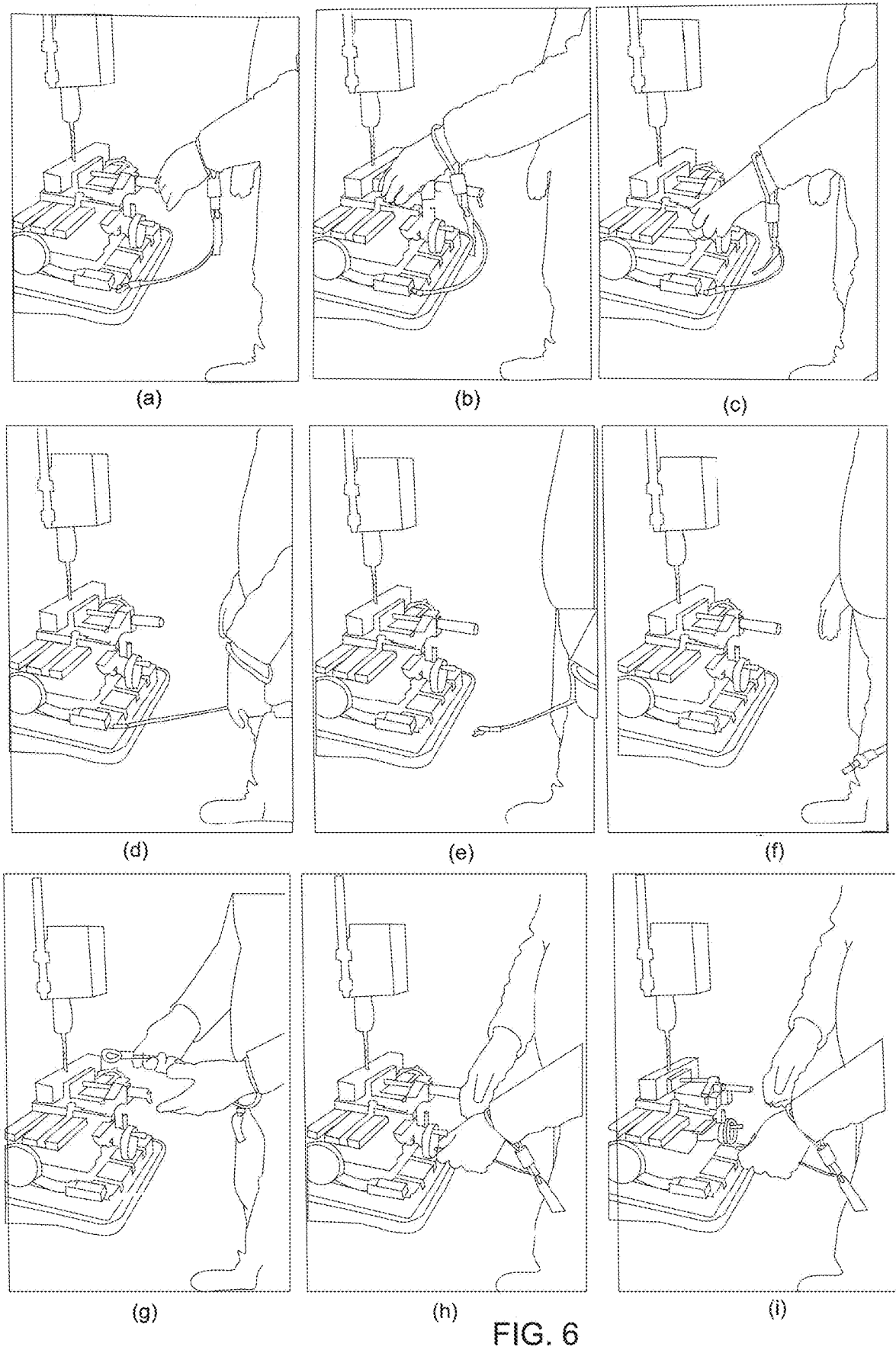
FIG. 6, divided into sections (a)-(I), is a sequence of photographic images showing the use as PPE of the sliding cable safety device of the invention.

For the sake of clarity and completeness of information, the sequence of photographic images of FIG. 6 shows an example of actual and effective use as PPE of the sliding cable safety device of the invention, wherein the safety device is worn at one end by an operator, in particular an arm thereof, and at the other end is connected to a switch or similar device of an electrically powered machine tool used by the same operator in his work.

Therefore, as shown by this sequence of photographic images, whereas necessary and in case of emergency, the operator reacts by rapidly moving his arm away from the machine tool, so as to control the switch of the machine tool by means of the safety device cable and therefore interrupt both the electrical supply and consequently also the operation of the same machine tool.

In the particular example shown in FIG. 6, in case of intervention of the safety device, the end of the safety device connected to the machine tool is completely detached from the latter so as to cause the interruption of the electrical supply and therefore also to end instantaneously the operation of the machine tool.

It is clear, however, that other ways are possible both for connecting the safety device, and in particular the respective flexible cable, to the machine or installation to be secured, and for instantly interrupting the electrical supply to the same machine or installation, in case of intervention of the safety device.

Figure 7A:
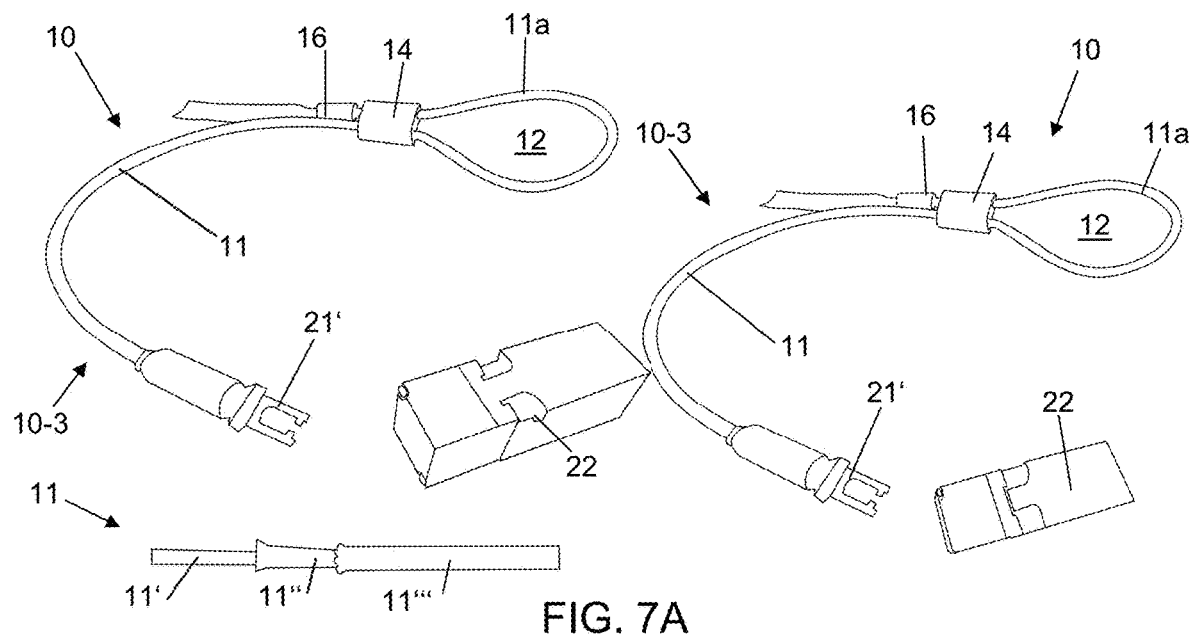
FIG. 7A is a graphic image showing, in partially decomposed form, the sliding cable safety device, according to the present invention, configured to be applied and operate as PPE.
Figure 7B:
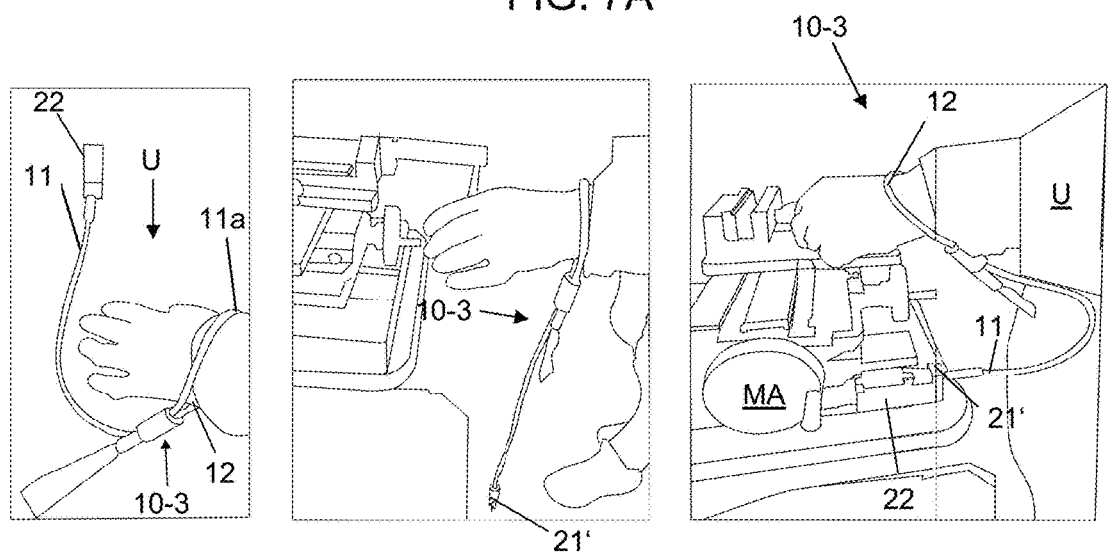
FIG. 7B, divided into sections (a)-(e), is a sequence of photographic images, supplementing the photographic images of FIG. 6, which show the sliding cable safety device of FIG. 7A, according to the present invention, in the effective use as PPE.
Figure 7B:
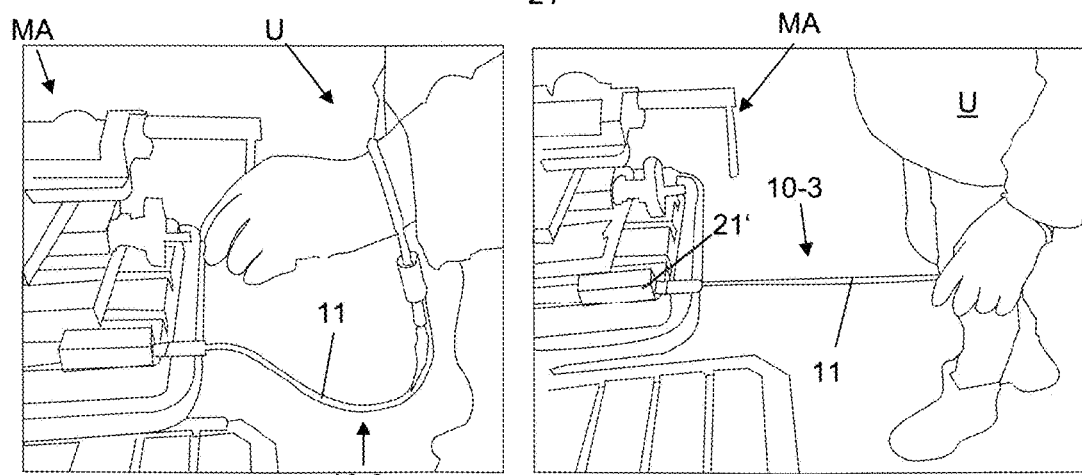

In addition to FIG. 6, FIGS. 7A and 7B of the drawings show respectively the parts, in partially decomposed form, and the use, as PPE, of a further embodiment, indicated with 10-3, of the sliding cable safety device 10, according to the present invention, wherein for reasons of economy and clarity, in this embodiment 10-3, the parts corresponding to those of the embodiments 10-1 and 10-2, described above, are indicated with the same numerical references.

In detail, the safety device 10, according to this embodiment 10-3 for use as PPE, has a single eyelet 12, formed, at one end of the safety device 10, by a corresponding end portion 11a of the sliding cable 11, and an activation element, indicated with 21', in the form of a tongue, fixed to the other end of the safety device 10 and of the sliding cable 11, wherein this tongue 21', corresponding to the cam 21 of the embodiments 10-1 and 10-2 described above, is adapted to cooperate with a micro-switch 22 or similar device to generate, if necessary and in a dangerous situation, an alarm signal and in particular immediately interrupt the operation of a machine MA on which the user, wearing the PPE, works.

FIG. 7A also shows for clarity the layered composite structure, already illustrated above with reference to the embodiments 10-1 and 10-2, of the sliding cable 11, comprising a core 11' consisting of a metal cable, one intermediate layer, indicated with 11", which covers the core 11' and is made up of interlaced threads of aramidic fibers or Kevlar or of polyester threads, and an external protective layer, which covers the intermediate layer 11" and is made up of polyester threads.

FIG. 7B in turn shows the safety device 10-3, in use as PPE, with the device 10-3 being attached to the wrist of a user U, and illustrates how it is used, in case of need, by of the same user, moving away from the machine MA on which he works, to detach the tongue 21' from the micro-switch 22 and in this way activate a signal which causes the immediate stop of the machine MA.

Further Embodiment of the Sliding Cable Safety Device, According to the Invention, Capable of Generating an Alarm Signal For a complete appreciation of the invention and of the various embodiments, sharing the same inventive concept, which it can assume, there will be described, with reference to FIGS. 8A and 8B, a further interesting embodiment and application, indicated with 10-4, of the safety device 10 with sliding cable of the invention.

Figure 8A:
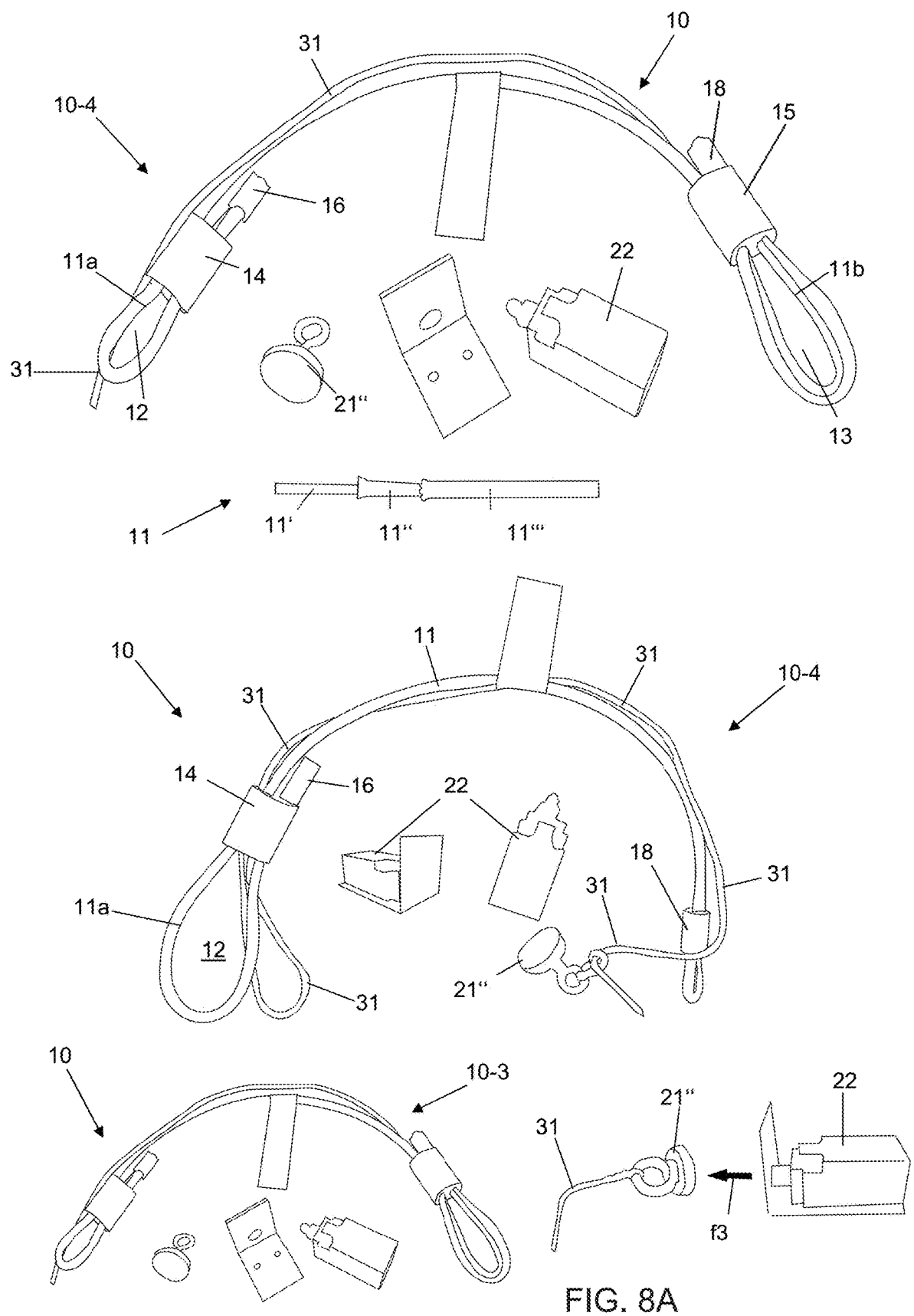
FIG. 8A is a graphic image showing, in partially decomposed form, the sliding cable safety device, of the present invention, according to a variant with a stop magnet.

In particular, as it can be seen in FIG. 8A which shows the parts that make up the safety device 10-4 in a partially broken down form, the latter includes, in addition to the same parts, therefore indicated with the same numerical references, which characterize the embodiments 10-1 and 10-2 described above, a magnetic element or permanent magnet, indicated with 21", fixed to one end of the activation cord 31, wherein this magnetic element 21", which can be magnetically fixed in a suitable area, is able to cooperate, when necessary, with a micro-switch 22 of the same safety device 10-4, as indicated by an arrow f3, to generate an alarm signal.

Figure 8B:
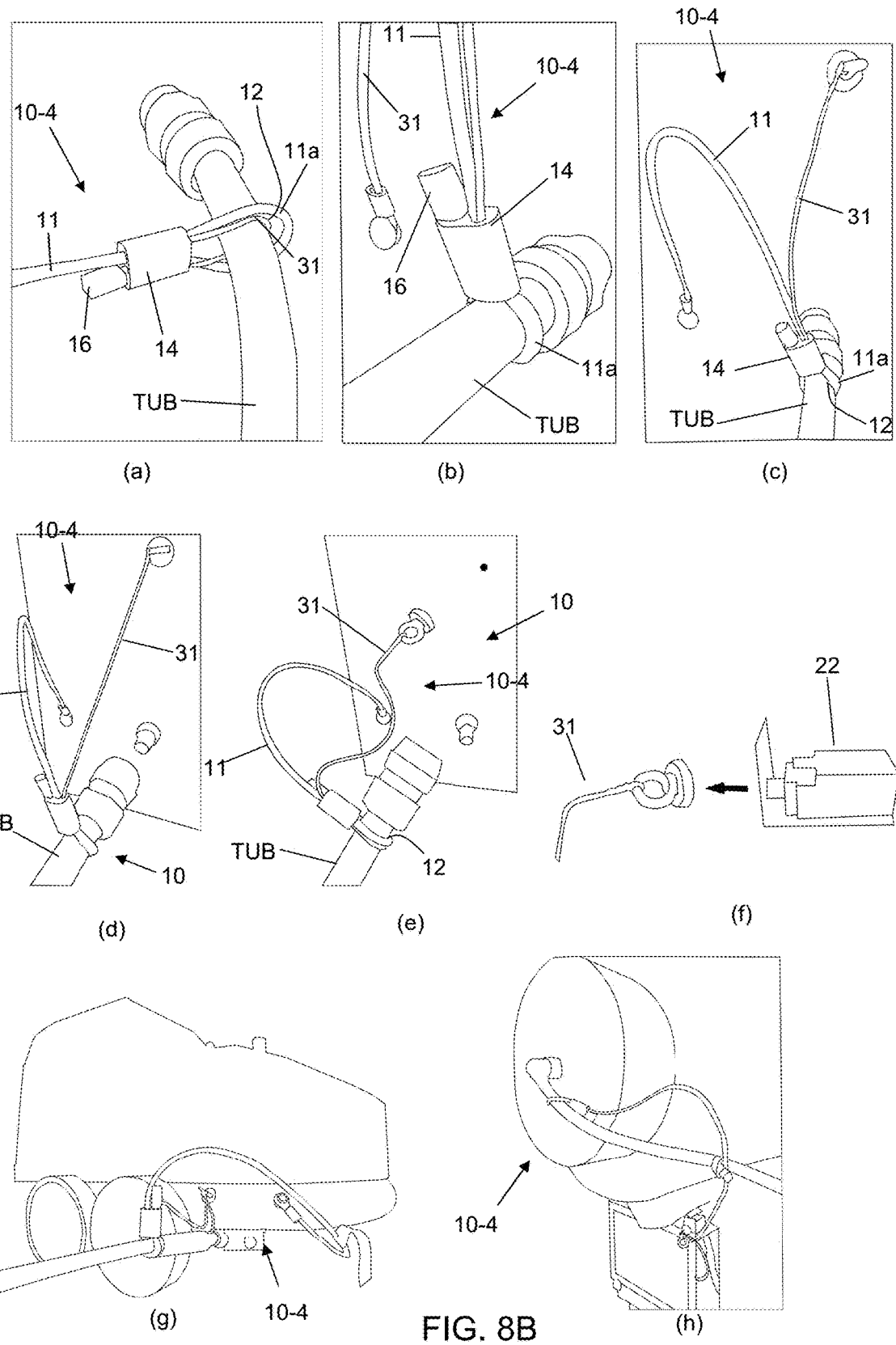
FIG. 8B, divided into sections (a)-(h), is a sequence of photographic images showing the sliding cable safety device in use according to the variant of FIG. 8A.

FIG. 8B, divided into sections (a)-(f), in turn shows in use the safety device 10-4, with the latter used to make safe and secure a pipe TUB, fed by a pressurized fluid, in the area of a junction of this pipe TUB.

As can be clearly seen from the sequence of the images of FIG. 8B—sections (a)-(f), in the event of an accident or anomaly or pressure peak that causes the pipe TUB to break and detach, in this junction area, the sudden movement of the part of the pipe TUB, on which the safety device 10-4 has been mounted, which detaches from the rest of the pipe TUB, causes, by the activation cord 31, the detachment of the magnetic element 21" from the wall on which it was mounted, so as to determine, by means of the micro-switch 22, the immediate stop of the system which supplies the pressurized fluid into the pipe TUB.

FIG. 8B, sections (g)-(h), in turn shows two other examples of application of the safety device 10-4, with sliding cable, of the invention, respectively to secure an air compression unit and a similar equipment.

In summary of the description of the sliding cable safety device 10 of the invention, it should be noted that the respective embodiments, as illustrated above, i.e. the emergency embodiment 10-1, the signalling embodiment 10-2, the embodiment 10-3, the embodiment 10-4 with magnet, are to be considered as sharing a common inventive concept which is essentially related to the capability of each of these embodiments 10-2, 10-3, 10-4 to generate an alarm signal in the event of an exceptional event that determines the intervention of the same safety device 10.

Therefore the means, included in each of these embodiments, which underlie and generate this alarm signal, such as for example the activation cord 31 or the sliding cable 11 itself, are to be considered functionally equivalent and linked by the aforementioned inventive concept, which allows the safety device 10 of the invention both to assume a plurality of embodiments and to be able to be advantageously used in a wide variety of applications.

In particular, thanks to this capability to generate an alarm signal, the sliding cable safety device 10 of the invention appear to be a universal safety device, i.e. not only a device suitable for securing an equipment or a machinery or a similar installation, but also a real and effective personal protective equipment or PPE designed to secure a respective user working on a machine, whose operation is subject to being interrupted, for safety reasons, following the intervention of the PPE worn by the same user.

The invention claimed is:

1. A sliding cable safety device to secure a system, a plant, a machine, a machinery, an equipment, a conduit, a pipe, or a similar installation and structure, subject over time and in operation to the danger and risk of breaking, exploding, failing, having an accident, or suffering a similar exceptional event, including:
   a sliding cable which has a first attachment eyelet and a second attachment eyelet formed respectively by two end portions of the sliding cable;
   a first ferrule or sleeve and a second ferrule or sleeve which slidably house said sliding cable and close the respective two end portions so as to form, at the two ends of the safety device, said first and second attachment eyelets; and
   two terminals provided at the two opposite ends of the sliding cable included in the safety device,
   whereby said first attachment eyelet and second attachment eyelet allow to attach and connect the safety device, at two opposite ends of the safety device, to two parts, adjacent, of said system, plant, machine, machinery, equipment, conduit, pipe, or similar installation and structure, to be secured, by sliding the sliding cable in said first and second sleeve so as to push the two terminals, provided at the two opposite ends of the sliding cable, to cooperate in contact with the first and with the second sleeve so as to tighten the two eyelets around said two parts of said system, plant, machine, machinery, equipment, conduit, pipe, or similar installation and structure, to be made safe using the same safety device, wherein the safety device further comprises:

signalling means designed to generate an alarm signal; and activation means which connect at least one area of the sliding cable, included in the safety device, to said signalling means, in order to activate said signalling means and therefore generate said alarm signal;

wherein said activation means consist of an activation cable or cord which connects said sliding cable to said signalling means;

whereby, in the event of a break, explosion, failure, accident or similar exceptional event in said system, plant, machine, machinery, equipment, conduit, pipe, or similar installation and structure, secured by said safety device, said sliding cable intervenes to hold said two parts of said system, plant, machinery, equipment, conduit, pipe, or similar installation and structure, so as to avoid further damage caused by said exceptional event, and furthermore said activation means, due to the movement of said sliding cable caused by said exceptional event, activate and control said signalling means so as to generate said alarm signal.

2. The sliding cable safety device according to claim 1, wherein said signalling means comprise a switch, or a similar device, for generating said alarm signal.

3. The sliding cable safety device according to claim 2, wherein said switch, included in said signalling means, is a manual reset position switch and said alarm signal, generated by said signalling means, is used as an emergency and locking signal for directly and automatically blocking the operation of the system, plant, machine, machinery, equipment, conduit, pipe, or similar installation and structure on which the safety device is mounted, in the event of a break, explosion, failure, accident or similar exceptional event in said system, plant, machine, machinery, equipment, conduit, pipe, or similar installation and structure.

4. The sliding cable safety device according to claim 2, wherein said switch, included in said signalling means, is a position switch without manual reset and said alarm signal, generated by said signalling means, is used only to signal the occurrence of an exceptional event in the system, plant, machine, machinery, equipment, conduit, pipe, or similar installation and structure on which the safety device is mounted, and wherein the operation of said system, plant, machine, machinery, equipment, conduit, pipe, or similar installation and structure on which the safety device is mounted, is automatically interrupted and locked in an autonomous and independent manner from said signalling means.

5. The sliding cable safety device according to claim 1, wherein each of said sleeves has two holes, distinct and separated from each other, which slidably house said sliding cable, and wherein each of said holes has a calibrated conical configuration suitable to exercise, in case of intervention of the safety device to hold the parts of the installation made safe by the safety device, an appropriate braking action on the flexible cable which slides in the two sleeves, so as to dampen also the vibrations which tend to trigger during this intervention.

6. The sliding cable safety device according to claim 1, wherein said alarm signal, generated by said signalling means, is intended to be used to stop, lock and in general, interrupt the operation of the system, plant, machine, machinery, equipment, conduit, pipe, or similar installation and structure made safe by the safety device.

7. The sliding cable safety device according to claim 1, wherein said signalling means are associated with the system, plant, machine, machinery, equipment, conduit, pipe, or similar installation and structure, to be secured.

8. An installation or machine or apparatus or plant including a safety device according to claim 1.

9. Method for securing a plant, a machine, a machinery, an apparatus, a pipeline, a pipe, or a similar installation and structure, subject over time and in operation to the danger and risk of breaking, exploding, failing, having an accident, or suffering a similar exceptional event, including the following steps:

mounting on said installation and structure, to be secured, a safety device with a sliding cable, according to claim 1;

wherein said mounting step comprises the step of attaching and connecting the first eyelet and the second eyelet, provided at the opposite ends of the safety device, to two adjacent parts, of said plant, machine, machinery, apparatus, pipeline, pipe, or similar installation and structure, by sliding the sliding cable of the safety device in the two sleeves of the same safety device, so as to tighten the two eyelets on the two parts, adjacent, of the plant, machine, machinery, apparatus, pipeline, pipe, or similar installation and structure to be secured;

whereby, in the event of a break, explosion, failure, accident or similar exceptional event in said plant, machine, machinery, apparatus, pipeline, pipe, or similar installation and structure, secured by the safety device, said sliding cable intervenes to hold said two parts of said plant, machine, machinery, apparatus, pipeline, pipe, or similar installation and structure, so as to avoid further damage caused by said exceptional event, and also said activation means, due to the sudden and rapid movement of said sliding cable caused by said exceptional event, activate and control said signalling means so as to generate an alarm signal; and processing said alarm signal, as an emergency and locking signal, to interrupt and block the operation of the plant, machine, machinery, apparatus, pipeline, pipe, or similar installation and structure on which the safety device is mounted; or processing said alarm signal only to signal the occurrence of the exceptional event in the plant, machine, machinery, apparatus, pipeline, pipe, or similar installation and structure on which the safety device is mounted.

* * * * *